United States Patent
Miyazaki et al.

(10) Patent No.: US 10,886,506 B2
(45) Date of Patent: Jan. 5, 2021

(54) CELL PACKAGING MATERIAL, METHOD FOR MANUFACTURING SAME, AND CELL

(71) Applicant: DAI NIPPON PRINTING CO., LTD., Tokyo (JP)

(72) Inventors: Kaoru Miyazaki, Tokyo (JP); Hirotoshi Sakamoto, Tokyo (JP); Yousuke Hayakawa, Tokyo (JP); Rikiya Yamashita, Tokyo (JP); Takanori Yamashita, Tokyo (JP); Tsuyoshi Suzuki, Tokyo (JP); Yoichi Mochizuki, Tokyo (JP); Kazuhiko Yokota, Tokyo (JP); Tetsuya Ojiri, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 108 days.

(21) Appl. No.: 15/561,704

(22) PCT Filed: Mar. 30, 2016

(86) PCT No.: PCT/JP2016/060575
§ 371 (c)(1),
(2) Date: Sep. 26, 2017

(87) PCT Pub. No.: WO2016/159190
PCT Pub. Date: Oct. 6, 2016

(65) Prior Publication Data
US 2018/0090724 A1 Mar. 29, 2018

(30) Foreign Application Priority Data

Mar. 30, 2015 (JP) ................... 2015-070359
Mar. 30, 2015 (JP) ................... 2015-070360
(Continued)

(51) Int. Cl.
*H01M 2/00* (2006.01)
*H01M 2/02* (2006.01)
(Continued)

(52) U.S. Cl.
CPC .......... *H01M 2/0287* (2013.01); *H01G 11/78* (2013.01); *H01G 11/80* (2013.01); *H01M 2/0277* (2013.01)

(58) Field of Classification Search
CPC ... H01M 11/78; H01M 2/0287; H01M 2/0277
See application file for complete search history.

(56) References Cited

U.S. PATENT DOCUMENTS

2008/0286635 A1 11/2008 Seino et al.
2009/0269580 A1* 10/2009 Shiba ................. B32B 27/32
428/340

(Continued)

FOREIGN PATENT DOCUMENTS

JP  2008-287971 A  11/2008
JP  2010-086744 A  4/2010
(Continued)

OTHER PUBLICATIONS

Jun. 28, 2016 International Search Report issued in International Patent Application No. PCT/JP2016/060575.
(Continued)

*Primary Examiner* — Cynthia H Kelly
*Assistant Examiner* — Monique M Wills
(74) *Attorney, Agent, or Firm* — Oliff PLC

(57) ABSTRACT

Provided is a cell packaging material having a high insulating performance and durability. A cell packaging material comprising a layered body provided with at least a substrate layer, a metal layer, an adhesive layer, and a heat-fusible resin layer in the stated order. The adhesive layer has a resin composition that contains an acid-modified polyolefin and an epoxy resin. In probe displacement amount measurements involving the use of a thermal mechanical analyzer, when a probe is placed on the surface of the adhesive layer at an end part of the cell packaging material and the probe (Continued)

is heated from 40° C. to 220° C., the position of the probe does not drop in relation to the initial value.

23 Claims, 6 Drawing Sheets

(30) Foreign Application Priority Data

Mar. 18, 2016 (JP) .................................. 2016-056037
Mar. 30, 2016 (JP) .................................. 2016-069528

(51) Int. Cl.
*H01G 11/78* (2013.01)
*H01G 11/80* (2013.01)

(56) References Cited

U.S. PATENT DOCUMENTS

| | | |
|---|---|---|
| 2013/0209868 A1 | 8/2013 | Suzuta et al. |
| 2014/0113166 A1* | 4/2014 | Schneider ........... H01M 10/654 |
| | | 429/62 |
| 2015/0380692 A1 | 12/2015 | Ojiri et al. |
| 2017/0141362 A1* | 5/2017 | Ijuin ...................... H01G 11/78 |
| 2017/0149025 A1* | 5/2017 | Hashimoto ............. B32B 15/20 |
| 2019/0157633 A1 | 5/2019 | Ojiri et al. |

FOREIGN PATENT DOCUMENTS

| | | |
|---|---|---|
| JP | 2013-120693 A | 6/2013 |
| JP | 2013-258162 A | 12/2013 |
| JP | 2014-175216 A | 9/2014 |
| JP | 2014-179308 A | 9/2014 |
| JP | 2015-036385 A | 2/2015 |
| JP | 2015-059200 A | 3/2015 |

OTHER PUBLICATIONS

Mar. 20, 2020 Office Action issued in Chinese Patent Application No. 201680019778.4.

\* cited by examiner

CELL PACKAGING MATERIAL, METHOD FOR MANUFACTURING SAME, AND CELL

TECHNICAL FIELD

The present invention relates to a battery packaging material, a method for producing the battery packaging material, and a battery.

BACKGROUND ART

Conventionally, various types of batteries have been developed. In these batteries, a battery element consisting of electrodes, an electrolyte and so on needs to be encapsulated in a packaging material or the like. As such a battery packaging material, metal packaging materials are generally used.

In association with the recent advanced performance of electric cars, hybrid electric cars, personal computers, cameras, mobile phones and so on, batteries having a variety of forms are demanded. It is also requested for batteries to have smaller thickness and lighter weight. However, metal packaging materials that are generally used heretofore have difficulty in keeping up with the diversified forms of batteries. Also weight reduction is limited because the packaging materials are made of metal.

Thus, there has been proposed a film-shaped laminate with a base material layer, a metal layer and a heat-sealable resin layer laminated in this order has been proposed as a battery packaging material which is easily processed into diversified shapes and is capable of achieving thickness reduction and weight reduction.

For example, Patent Document 1 discloses a packaging material for a battery casing, including a biaxially-stretched polyamide film layer as an outer layer, a thermoplastic resin unstretched film layer as an inner layer, and an aluminum foil layer disposed between these films.

Patent Document 2 discloses a lithium ion battery outer packaging material in which a base material layer, an adhesive agent layer, an aluminum foil layer provided with a corrosion inhibition treatment layer, an adhesive resin layer, and a sealant layer provided on the adhesive resin layer on a side opposite to the base material layer, and the adhesive resin layer contains an acid-modified polyolefin resin and an elastomer.

PRIOR ART DOCUMENTS

Patent Documents

Patent Document 1: Japanese Patent Laid-open Publication No. 2008-287971
Patent Document 2: Japanese Patent Laid-open Publication No. 2013-258162

SUMMARY OF THE INVENTION

Problems to be Solved by the Invention

However, the present inventors made diligent efforts repeatedly, and found a problem that in the battery packaging material as disclosed in Patent Document 2, the insulation quality and durability may be deteriorated when the battery packaging material is applied to a battery.

Accordingly, the present inventors further made diligent efforts and revealed that in the manufacturing process of a battery, very small contaminants such as debris of an electrode active material and an electrode tab may stick to the surface of a heat-sealable resin layer, and the part where the contaminants adhere in the heat-sealable resin layer can be thinned by the heat and the pressure at the time of heat-sealing a battery element with a battery packaging material. For example, if the heat-sealable resin layer is thinned in the part where the heat-sealable resin layers are heat-sealed, there arises the problem that the insulation quality and durability of the battery packaging material are insufficient.

Further, very small contaminants such as debris of an electrode active material and an electrode tab have conductivity. When conductive contaminants exist between an electrode tab and a heat-sealable resin layer, there is a possibility that the heat and the pressure at the time of heat sealing make the contaminants penetrate in the heat-sealable resin layer, and the electrode tab and the metal layer of the battery packaging material can be electrically connected to cause a short circuit.

The present invention was devised in consideration of these problems. Specifically, it is a primary object of the present invention to provide a battery packaging material having high insulation quality and durability even when very small contaminants such as debris of an electrode active material and an electrode tab exist in the part that is to be heat-sealed, such as in an interface between the heat-sealable resin layers or between the electrode tab and the heat-sealable resin layer.

Means for Solving the Problems

The present inventors have extensively conducted studies for solving the above-mentioned problems. Resultantly, the present inventors have found that when a battery packaging material is a laminate including at least a base material layer, a metal layer, an adhesive layer and a heat-sealable resin layer in this order, and the adhesive layer includes a resin composition containing an acid-modified polyolefin having a melting point of 50 to 120° C. and an epoxy resin having a weight average molecular weight of 50 to 2000, the battery packaging material has high insulation quality and durability. The present inventors have found that when a battery packaging material is a laminate including at least a base material layer, a metal layer, an adhesive layer and a heat-sealable resin layer in this order, the adhesive layer includes a resin composition containing an acid-modified polyolefin and an epoxy resin, and in heating of a probe from 40° C. to 220° C. with the probe installed on a surface of the adhesive layer at an end part of the battery packaging material in measurement of the amount of displacement of the probe using a thermomechanical analyzer, the position of the probe does not become lower than an initial value, the battery packaging material has excellent insulation quality and durability. The first invention of the present invention has been completed by further conducting studies based on the above-mentioned findings.

That is, the first invention provides a battery packaging material, a method for producing the same, and a battery of the following aspects.

Item 1A. A battery packaging material including a laminate including at least a base material layer, a metal layer, an adhesive layer and a heat-sealable resin layer in this order, wherein
the adhesive layer includes a resin composition containing an acid-modified polyolefin and an epoxy resin, and
in heating of a probe from 40° C. to 220° C. with the probe installed on a surface of the adhesive layer at an end part of the battery packaging material in measurement of the amount of displacement of the probe using a thermomechanical analyzer, the position of the probe does not become lower than an initial value.

Item 2A. The battery packaging material according to item 1A, wherein in heating of a probe from 40° C. to 220° C. with the probe installed on a surface of the adhesive layer at an end part of the battery packaging material in measurement of the amount of displacement of the probe using a thermomechanical analyzer, the position elevation amount of the probe in heating of the probe from 140° C. to 220° C. is larger than the position elevation amount of the probe in heating of the probe from 80° C. to 120° C.

Item 3A. The battery packaging material according to item 1A or 2A, wherein the adhesive layer includes a resin composition containing an acid-modified polyolefin having a melting point of 50° C. or higher and 120° C. or lower and an epoxy resin having a weight average molecular weight of 50 or more and 2000 or less.

Item 4A. A battery packaging material including a laminate including at least a base material layer, a metal layer, an adhesive layer and a heat-sealable resin layer in this order, wherein
the adhesive layer includes a resin composition containing an acid-modified polyolefin having a melting point of 50° C. or higher and 120° C. or lower and an epoxy resin having a weight average molecular weight of 50 or more and 2000 or less.

Item 5A. The battery packaging material according to any one of items 1A to 4A, wherein a solid content of the adhesive layer is 0.5 g/m² or more and 10 g/m² or less.

Item 6A. The battery packaging material according to any one of items 1A to 5A, wherein a thickness of the adhesive layer is 0.6 μm or more and 9 μm or less.

Item 7A. The battery packaging material according to any one of items 1A to 6A, wherein the adhesive layer contains 0.5 parts by mass or more and 20 parts by mass or less of an epoxy resin based on 100 parts by mass of the acid-modified polyolefin.

Item 8A. The battery packaging material according to any one of items 1A to 7A, wherein a melting temperature of the adhesive layer is 180° C. or higher and 260° C. or lower.

Item 9A. The battery packaging material according to any one of items 1A to 8A, wherein a thickness of the heat-sealable resin layer is 10 μm or more and 40 μm or less.

Item 10A. The battery packaging material according to any one of items 1A to 9A, wherein the heat-sealable resin layer has fine irregularities formed on a surface thereof.

Item 11A. A battery, wherein a battery element including a positive electrode, a negative electrode and an electrolyte is contained in a package formed of the battery packaging material according to any one of items 1A to 10A.

Item 12A. A method for producing a battery packaging material, the method including a lamination step of preparing a laminate including at least a base material layer, a metal layer, an adhesive layer and a heat-sealable resin layer in this order, wherein
a resin composition containing an acid-modified polyolefin and an epoxy resin is used in formation of the adhesive layer, and
the adhesive layer is an adhesive layer in which in heating of a probe from 40° C. to 220° C. with the probe installed on a surface of the adhesive layer at an end part of the battery packaging material in measurement of the displacement amount of the probe using a thermomechanical analyzer, the position of the probe does not become lower than an initial value.

The present inventors have further extensively conducted studies for solving the above-mentioned problems. Resultantly, when a battery packaging material is a laminate including at least a base material layer, a metal layer, a first insulating layer, a second insulating layer and a heat-sealable resin layer in this order, the melting temperature of the first insulating layer is 200° C. or higher, and the melting temperature of the second insulating layer is set lower than the melting temperature of the first insulating layer, the battery packaging material has high insulation quality and durability. The second invention of the present invention has been completed by further conducting studies based on the above-mentioned findings.

That is, the second invention provides a battery packaging material, a method for producing the same, and a battery of the following aspects.

Item 1B. A battery packaging material including a laminate including at least a base material layer, a metal layer, a first insulating layer, a second insulating layer and a heat-sealable resin layer in this order, wherein
a melting temperature of the first insulating layer is 200° C. or higher, and
a melting temperature of the second insulating layer is lower than the melting temperature of the first insulating layer.

Item 2B. The battery packaging material according to item 1B, wherein the first insulating layer is formed of an acid-modified polyolefin and an epoxy resin.

Item 3B. The battery packaging material according to item 1B or 2B, wherein the second insulating layer is formed of a polypropylene having a melting temperature of 150° C. or higher.

Item 4B. The battery packaging material according to any one of items 1B to 3B, wherein a melting temperature of the heat-sealable resin layer is lower than the melting temperature of the second insulating layer.

Item 5B. The battery packaging material according to any one of items 1B to 4B, wherein the first insulating layer and the second insulating layer are bonded with an adhesive layer interposed therebetween.

Item 6B. The battery packaging material according to any one of items 1B to 5B, wherein a thickness of the first insulating layer is 10 μm or less.

Item 7B. The battery packaging material according to any one of items 1B to 6B, wherein a thickness of the second insulating layer is 10 μm or more and 50 μm or less.

Item 8B. The battery packaging material according to any one of items 5B to 7B, wherein a thickness of the adhesive layer is 20 μm or less.

Item 9B. The battery packaging material according to any one of items 1B to 8B, wherein the heat-sealable resin layer is formed of a polyolefin.

Item 10B. The battery packaging material according to any one of items 1B to 9B, wherein the heat-sealable resin layer has fine irregularities on a surface thereof.

Item 11B. The battery packaging material according to any one of items 1B to 10B, wherein the heat-sealable resin layer includes a plurality of layers, and an innermost layer of the heat-sealable resin layer is a layer formed by a dry lamination method or extrusion molding.

Item 12B. A battery, wherein a battery element including a positive electrode, a negative electrode and an electrolyte is encapsulated in a package formed of the battery packaging material according to any one of items 1B to 11B.

Item 13B. A method for producing a battery packaging material, the method including the step of preparing a laminate including at least a base material layer, a metal layer, a first insulating layer, a second insulating layer and a heat-sealable resin layer in this order, wherein a melting temperature of the first insulating layer is 200° C. or higher, and a melting temperature of the second insulating layer is set lower than the melting temperature of the first insulating layer.

Advantages of the Invention

According to the battery packaging material of the present invention, it is possible to provide a battery packaging material having high insulation quality and durability even when very small contaminants such as debris of an electrode active material and an electrode tab exist in the part that is to be heat-sealed, such as in an interface between the heat-sealable layers, or between the electrode tab and the heat-sealable layer. That is, by sealing a battery element with the battery packaging material of the present invention, it is possible to improve the insulation quality and durability of the battery.

EMBODIMENTS OF THE INVENTION

In a first embodiment of the first invention, a battery packaging material includes a laminate including at least a base material layer, a metal layer, an adhesive layer and a heat-sealable resin layer in this order, wherein the adhesive layer includes a resin composition containing an acid-modified polyolefin having a melting point of 50 to 120° C. and an epoxy resin having a weight average molecular weight of 50 to 2000. In a second embodiment of the first invention, a battery packaging material includes a laminate including at least a base material layer, a metal layer, an adhesive layer and a heat-sealable resin layer in this order, wherein the adhesive layer includes a resin composition containing an acid-modified polyolefin and an epoxy resin, and in heating of a probe from 40° C. to 220° C. with the probe installed on a surface of the adhesive layer at an end part of the battery packaging material in measurement of the amount of displacement of the probe using a thermomechanical analyzer, the position of the probe does not become lower than an initial value. Hereinafter, a battery packaging material of the present invention, a method for producing the same, and a battery of the present invention in which a battery element is encapsulated in the battery packaging material of the present invention will be described in detail with reference to FIGS. 1 to 3. In the description below, matters that are not common to the first embodiment and the second embodiment are indicated clearly, and other matters are common to these embodiments unless otherwise specified.

A battery packaging material of the second embodiment includes a laminate including at least a base material layer, a metal layer, a first insulating layer, a second insulating layer and a heat-sealable resin layer in this order, wherein a melting temperature of the first insulating layer is 200° C. or higher, and a melting temperature of the second insulating layer is lower than the melting temperature of the first insulating layer. Hereinafter, a battery packaging material of the present invention, a method for producing the same, and a battery of the second invention in which a battery element is encapsulated in the battery packaging material of the second invention will be described in detail with reference to FIGS. 9 to 12. In the description below, matters that are not common to the first invention and the second invention are indicated clearly, and other matters are common to these inventions unless otherwise specified. For example, a base material layer 1, an adhesive agent layer 2, a metal layer 3 and a surface coating layer are common to the first invention and the second invention.

1. Laminated Structure of Battery Packaging Material

Figure 1:
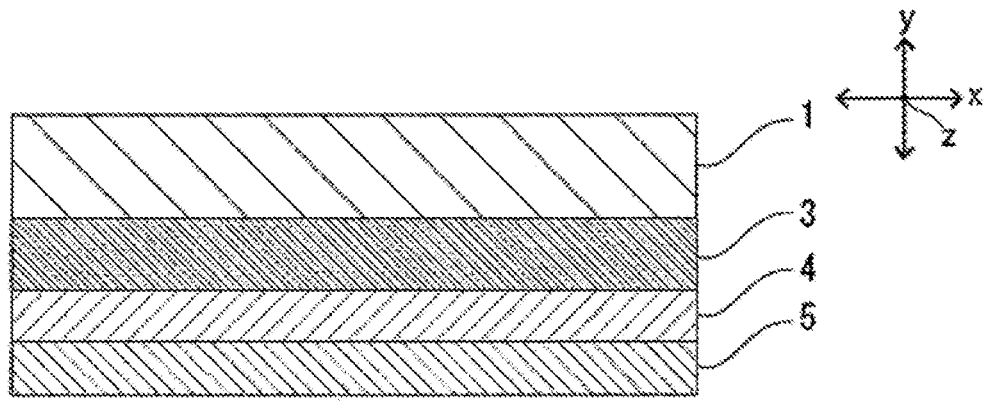
FIG. 1 is a schematic sectional view of one example of a battery packaging material according to the first invention.

The battery packaging material of the first invention includes a laminate including at least a base material layer 1, a metal layer 3, an adhesive layer 4 and a heat-sealable resin layer 5 as shown in FIG. 1. In the battery packaging material of the present invention, the base material layer 1 is an outermost layer, and the heat-sealable resin layer 5 is an innermost layer. That is, at the time of assembling a battery, the heat-sealable resin layer 5 situated on the periphery of a battery element is heat-sealed with itself to hermetically seal the battery element, so that the battery element is encapsulated.

Figure 2:
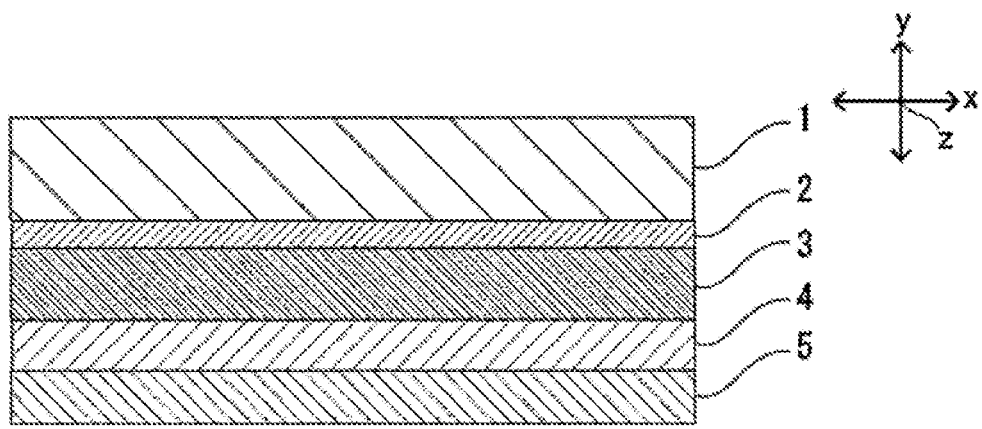
FIG. 2 is a schematic sectional view of one example of the battery packaging material according to the first invention.
Figure 3:
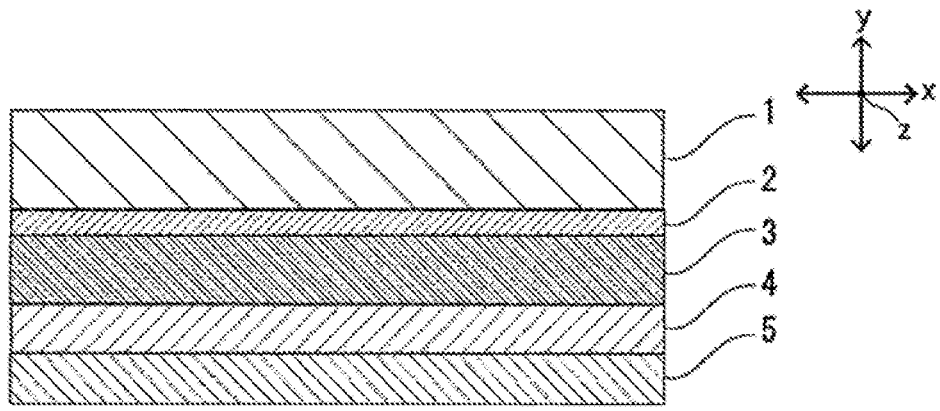
FIG. 3 is a schematic sectional view of one example of the battery packaging material according to the first invention.

As shown in FIG. 2, the battery packaging material of the first invention may be provided with an adhesive agent layer 2 between the base material layer 1 and the metal layer 3 as necessary in order to improve adhesion of these layers.

Figure 9:
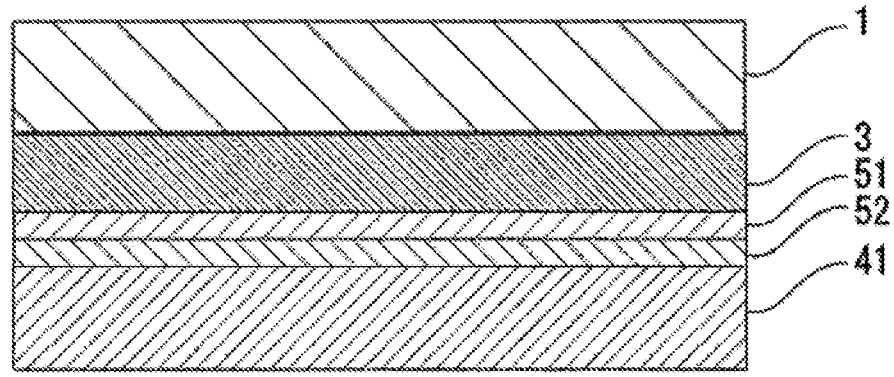
FIG. 9 is a schematic sectional view of one example of a battery packaging material according to the second invention.

The battery packaging material of the second invention includes a laminate including at least the base material layer 1, the metal layer 3, a first insulating layer 51, a second insulating layer 52 and a heat-sealable resin layer 41 as shown in FIG. 9. When the battery packaging material of the second invention does not include the later-described surface coating layer, the base material layer 1 is an outermost layer, and the heat-sealable resin layer 41 is an innermost layer. That is, at the time of assembling a battery, the heat-sealable resin layer 41 situated on the periphery of a battery element is heat-welded with itself to hermetically seal the battery element, so that the battery element is encapsulated.

Figure 10:
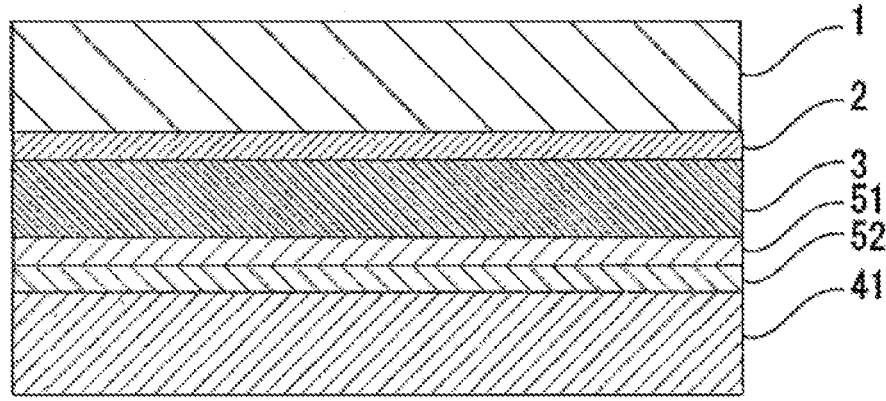
FIG. 10 is a schematic sectional view of one example of the battery packaging material according to the second invention.
Figure 11:
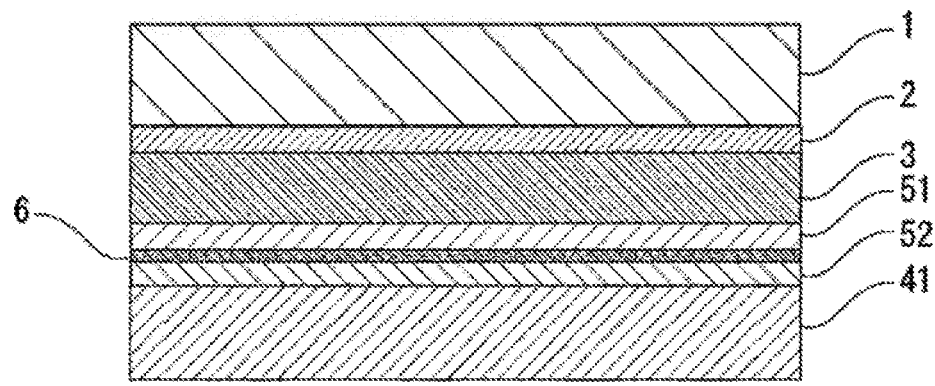
FIG. 11 is a schematic sectional view of one example of the battery packaging material according to the second invention.
Figure 12:
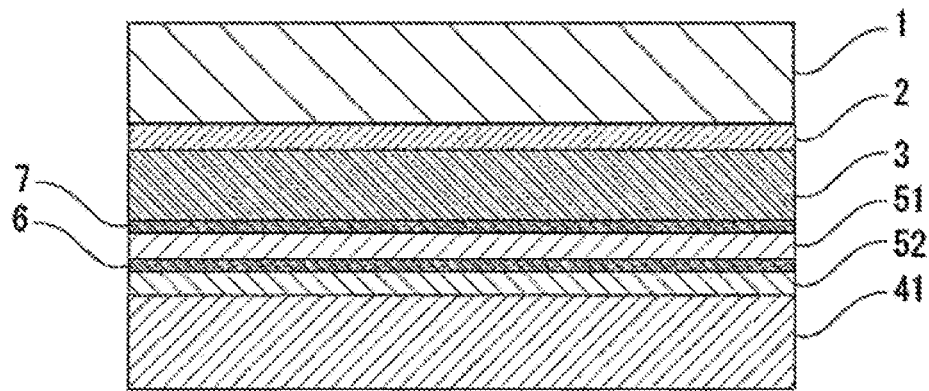
FIG. 12 is a schematic sectional view of one example of the battery packaging material according to the second invention.

As shown in FIG. 10, the battery packaging material of the second invention may be provided with an adhesive agent layer 2 between the base material layer 1 and the metal layer 3 as necessary in order to improve adhesion of these layers. As shown in FIGS. 11 and 12, the battery packaging material of the second invention may be provided with an adhesive layer 6 between the first insulating layer 51 and the second insulating layer 52 as necessary in order to improve adhesion of these layers. As shown in FIG. 12, an adhesive layer 7 may be provided between the metal layer 3 and the first insulating layer 51 as necessary in order to improve adhesiveness of these layers.

2. Composition of Each Layer Forming Battery Packaging Material

[Base Material Layer 1]

In the battery packaging material of the present invention, the base material layer 1 is a layer situated as an outermost layer. The material that forms the base material layer 1 is not particularly limited as long as it has an insulation quality. Examples of the material that forms the base material layer 1 include resin films of polyester resin, polyamide resin, epoxy resin, acrylic resin, fluororesin, polyurethane resin, silicone resin, phenol resin and mixtures and copolymers thereof. Among them, a polyester resin and a polyamide resin are preferred, and a biaxially stretched polyester resin and a biaxially stretched polyamide resin are more preferred. Specific examples of the polyester resin include polyethylene terephthalate, polybutylene terephthalate, polyethylene naphthalate, polybutylene naphthalate, copolyester and polycarbonate. Specific examples of the polyamide resin include nylon 6, nylon 6,6, a copolymer of nylon 6 and nylon 6,6, nylon 6,10, and polymethaxylyleneadipamide (MXD6).

The base material layer 1 may be formed of a single layer resin film, or may be formed of a resin film having two or more layers for improving pinhole resistance and an insulation quality. Specific examples include a multilayer structure in which a polyester film and a nylon film are laminated, a multilayer structure in which a plurality of nylon films are laminated, and a multilayer structure in which a plurality of polyester films are laminated. When the base material layer 1 has a multilayer structure, a laminate of a biaxially stretched nylon film and a biaxially stretched polyester film, a laminate in which a plurality of biaxially stretched nylon films are laminated, or a laminate in which biaxially stretched polyester films are laminated is preferable. For example, when the base material layer 1 is formed from two resin films, the base material layer 1 has preferably a configuration in which a polyester resin and a polyester resin are laminated, a configuration in which a polyamide resin and a polyamide resin are laminated, or a configuration in which a polyester resin and a polyamide resin are laminated, more preferably a configuration in which polyethylene terephthalate and polyethylene terephthalate are laminated, a configuration in which nylon and nylon are laminated, or a configuration in which polyethylene terephthalate and nylon are laminated. In the lamination configuration, it is preferable that the base material layer 1 is laminated so as to situate a polyester resin at the outermost layer because the polyester resin is hardly discolored in deposition of, for example, an electrolytic solution on the surface. When the base material layer 1 has a multilayer structure, the thickness of each layer is preferably 2 µm or more and 25 µm or less.

When the base material layer 1 is to be formed of a multilayer resin film, two or more resin films may be laminated together with an adhesive component such as an adhesive agent or an adhesive resin interposed therebetween, and the kind, amount and so on of the adhesive component to be used are similar to those for the later-described adhesive agent layer 2. The method for laminating a resin film having two or more layers is not particularly limited, and a known method can be employed. Examples thereof include a dry lamination method and a sand lamination method, and a dry lamination method is preferred. When the resin film is laminated by a dry lamination method, it is preferred to use a urethane-based adhesive agent as the adhesive layer. Here, the thickness of the adhesive layer is, for example, about 2 µm or more and 5 µm or less.

The thickness of the base material layer 1 is not particularly limited as long as a function as a base material layer is performed, and the thickness of the base material layer 1 is, for example, about 4 µm or more and 50 µm or less, preferably about 10 µm or more and 35 µm or less.

[Adhesive Agent Layer 2]

In the battery packaging material of the present invention, the adhesive agent layer 2 is a layer provided between the base material layer 1 and the metal layer 3 as necessary for strongly bonding these layers to each other.

The adhesive agent layer 2 is formed from an adhesive capable of bonding the base material layer 1 and the metal layer 3. The adhesive used for forming the adhesive agent layer 2 may be a two-liquid curable adhesive, or may be a one-liquid curable adhesive. Further, the adhesion mechanism of the adhesive used for forming the adhesive agent layer 2 is not particularly limited, and may be any one of a chemical reaction type, a solvent volatilization type, a heat melting type, a heat pressing type and so on.

Specific examples of the adhesive component that can be used for forming the adhesive agent layer 2 include polyester-based resins such as polyethylene terephthalate, polybutylene terephthalate, polyethylene naphthalate, polybutylene naphthalate, polyethylene isophthalate, polycarbonate and a copolyester; polyether-based adhesive agents; polyurethane-based adhesive agents; epoxy-based resins; phenol resin-based resins; polyamide-based resins such as nylon 6, nylon 66, nylon 12 and a copolymerized polyamide; polyolefin-based resins such as a polyolefin, a carboxylic acid-modified polyolefin and a metal-modified polyolefin, and a polyvinyl acetate-based resin; cellulose-based adhesive agents; (meth)acryl-based resins; polyimide-based resins; amino resins such as a urea resin and a melamine resin; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesives are preferred.

The thickness of the adhesive agent layer 2 is not particularly limited as long as a function as a base material layer is performed, and the thickness of the adhesive layer 2 is, for example, about 1 µm or more and 10 µm or less, preferably about 2 µm or more and 5 µm or less.

[Metal Layer 3]

In the battery packaging material, the metal layer 3 is a layer that is intended to improve the strength of the battery packaging material, and also functions as a barrier layer for preventing ingress of water vapor, oxygen, light and the like into the battery. Specific examples of the metal forming the metal layer 3 include aluminum, stainless and titanium, with aluminum being preferred. The metal layer 3 can be formed from metal foil or by metal deposition, and is preferably formed from metal foil, more preferably from aluminum foil. From the viewpoint of preventing generation of wrinkles and pinholes in the metal layer 3 during production of the battery packaging material, it is more preferred to form the metal layer 3 from soft aluminum foil such as annealed aluminum (JIS H4160 A8021H-O, JIS H4160 A8079H-O, JIS H4000:2014 A8021P-O, JIS H4000:2014 A8079P-O).

While the thickness of the metal layer 3 is not particularly limited as long as a function as a barrier layer to water vapor is performed, it may be, for example, about 10 μm or more and 50 μm or less, preferably about 10 μm or more and 35 μm or less.

Preferably, at least one surface, preferably both surfaces, of the metal layer 3 are subjected to a chemical conversion treatment for stabilization of bonding, prevention of dissolution and corrosion, and so on. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4). In the aminated phenol polymer, the repeating units represented by the following general formulae (1) to (4) may be contained alone, or may be contained in combination of two or more thereof.

[Chemical Formula 1]

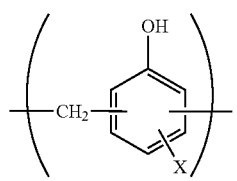

(1)

[Chemical Formula 2]

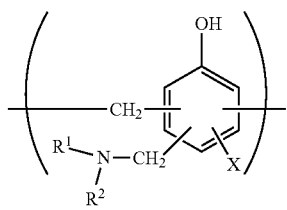

(2)

[Chemical Formula 3]

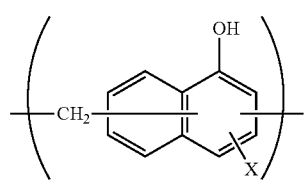

(3)

[Chemical Formula 4]

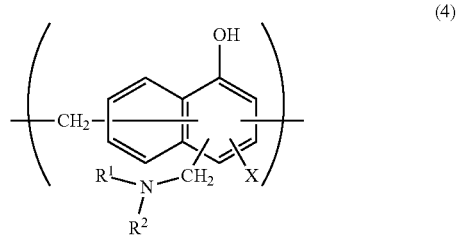

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represents a hydroxyl group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxyl group or a hydroxyalkyl group. A number average molecular weight of the aminated phenol polymer having repeating units represented by the general formulae (1) to (4) is preferably 500 or more and 1000000 or less, and more preferably about 1000 or more and 20000 or less, for example.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the metal layer 3 in the chemical conversion treatment is not particularly limited, but for example when the chromate treatment is performed, it is desirable that the chromic acid compound be contained in an amount of about 0.5 mg or more and about 50 mg or less, preferably about 1.0 mg or more and about 40 mg or less, in terms of chromium, the phosphorus compound be contained in an amount of about 0.5 mg or more and about 50 mg or less, preferably about 1.0 mg or more and about 40 mg or less, in terms of phosphorus, and the aminated phenol polymer be contained in an amount of about 1 mg or more and about 200 mg or less, preferably about 5.0 mg or more and about 150 mg or less, per 1 m$^2$ of the surface of the metal layer 3.

The chemical conversion treatment is performed in the following manner: a solution containing a compound to be used for formation of an acid resistance film is applied to the surface of the metal layer by a bar coating method, a roll coating method, a gravure coating method, an immersion method or the like, and heating is then performed so that the temperature of the metal layer is about 70° C. or higher and 200° C. or lower. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Adhesive Layer 4]

In the first invention, the adhesive layer 4 is a layer provided between the metal layer 3 and the heat-sealable resin layer 5 for improving the insulation quality and durability of the battery packaging material.

In the first embodiment of the first invention, the adhesive layer 4 includes a resin composition containing an acid-modified polyolefin having a melting point of 50° C. or higher and 120° C. or lower and an epoxy resin having a weight average molecular weight of 50 or more and 2000 or less. Preferably, the adhesive layer 4 is formed of the resin composition. The adhesive layer 4 may contain additives such as an antiblocking agent (silica etc.), and such additives may be contained in the resin composition. In the resin composition contained in the adhesive layer 4, the acid-modified polyolefin having a melting point of 50° C. or higher and 120° C. or lower functions as a main agent, and the epoxy resin having a weight average molecular weight of 50 or more and 2000 or less functions as a curing agent. In the battery packaging material, the resin composition is a cured product. In the second embodiment of the first invention, the adhesive layer 4 includes a resin composition containing an acid-modified polyolefin and an epoxy resin. In the resin composition contained in the adhesive layer 4 in the second embodiment, the acid-modified polyolefin functions as a main agent, and the epoxy resin functions as a curing agent. In the battery packaging material, the resin composition is a cured product. In the second embodiment, the melting point of the acid-modified polyolefin is preferably 50° C. or higher and 120° C. or lower, and the weight average molecular weight of the epoxy resin is preferably 50 or more and 2000 or less.

Figure 4:
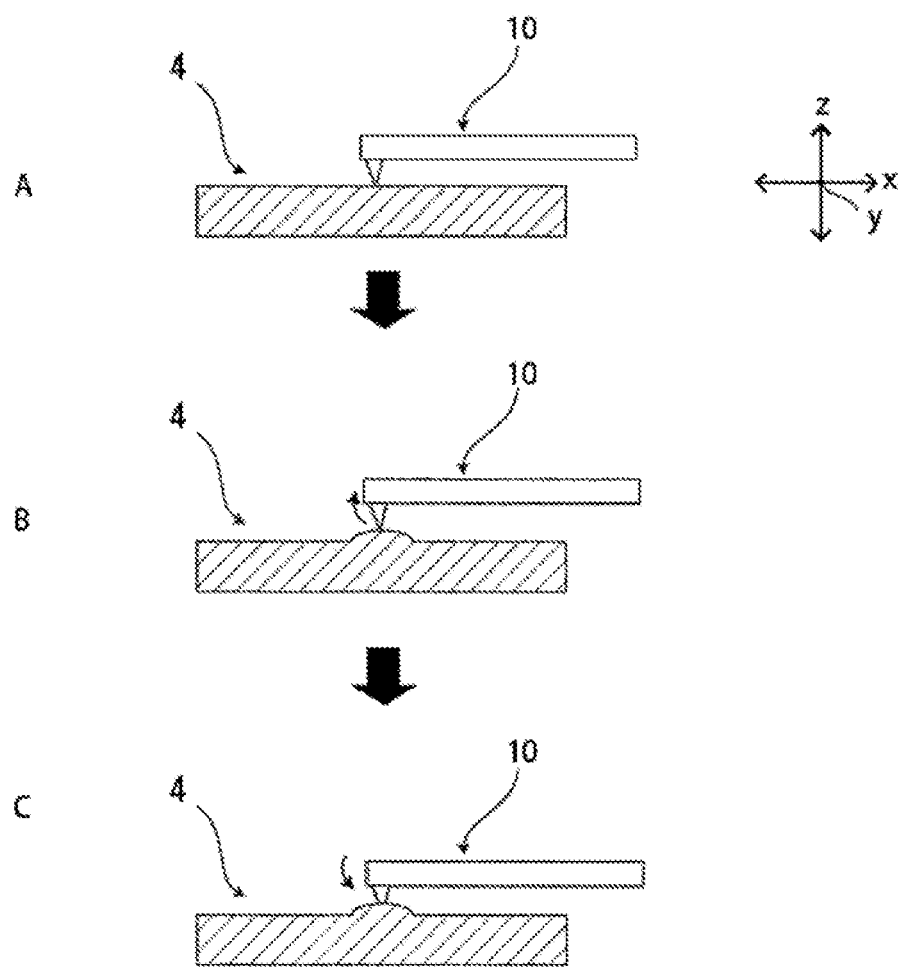
FIG. 4 is conceptual view showing a change in position of a probe in measurement of the displacement amount of the probe using a thermomechanical analyzer.

In measurement of the displacement amount of a probe using a thermomechanical analyzer, first a probe 10 of a thermomechanical analyzer is installed on a surface of the adhesive layer 4 at an end part of the battery packaging material as shown in, for example, the conceptual view in FIG. 4. (FIG. 4A: Start of measurement). Here, the end part is a part which is obtained by cutting the battery packaging material so as to pass through the central part of the battery packaging material and in which the cross-section of the adhesive layer 4 is exposed. The battery packaging material can be cut using a commercially available rotary microtome. When the displacement amount is measured for a battery packaging material that is used in a battery containing an electrolyte and so on, the measurement is performed for a part at which a heat-weldable resin layer of the battery packaging material is heat-sealed with itself. As the thermomechanical analyzer, an atomic force microscope, to which a cantilever with a heating mechanism is attached, can be used. The tip diameter of the probe 10 is 30 nm or less, the load on the probe 10 is a deflection—4 V, and the temperature elevation rate is 5° C./minute. Next, the probe is heated in this state, and consequently, by heat from the probe, a surface of the adhesive layer 4 is expanded to push up the probe 10 as described in FIG. 4B, so that the position of the probe 10 becomes higher than an initial value (position at which the temperature of the probe is 40° C.). When the heating temperature increases, the adhesive layer 4 is softened, the probe 10 sticks into the adhesive layer 4 as shown in FIG. 4C, so that the position of the probe 10 is lowered. In measurement of the displacement amount of a probe using a thermomechanical analyzer, a battery packaging material to be measured is placed under room temperature (25° C.), the probe heated to 40° C. is installed on a surface of the adhesive layer 4, and measurement is started.

In the battery packaging materials of the first and second embodiments of the first invention, for further improving insulation quality and durability, it is preferable that in heating of the probe from 40° C. to 220° C. (more preferably from 40° C. to 250° C.), the position of the probe 10 installed on a surface of the adhesive layer 4 does not become lower than an initial value (position at which the temperature of the probe is 40° C.), and it is more preferable that in heating of the probe from 160° C. to 200° C., the position of the probe 10 installed on a surface of the adhesive layer 4 does not become lower than the initial value. The step of encapsulating the battery element by heat-sealing the heat-sealable resin layer of the battery packaging material with itself is usually carried out by heating the battery packaging material to about 160° C. to 200° C. Thus, a battery packaging material, for which the position of the probe 10 installed on a surface of the adhesive layer 4 is not lowered in heating of the probe from 160° C. to 200° C., can exhibit particularly high insulation quality and durability.

From the same viewpoint, it is preferable that in heating of the probe 10 from 40° C. to 220° C. (more preferably from 40° C. to 250° C.) with the probe 10 installed on a surface of the adhesive layer 4 at an end part of the battery packaging material in measurement of the amount of displacement of the probe 10 using a thermomechanical analyzer, the position elevation amount of the probe 10 in heating of the probe from 140° C. to 220° C. is larger than the position elevation amount of the probe 10 in heating of the probe from 80° C. to 120° C.

As described above, in the production process of batteries, very small contaminants such as debris of an electrode active material and an electrode tab may stick to the surface of the heat-sealable resin layer, and accordingly thin parts and through-holes may be generated in the heat-sealable resin layer, leading to deterioration of insulation quality. On the other hand, in the battery packaging material of the first embodiment of the first invention, the adhesive layer 4 that bonds the metal layer 3 and the heat-sealable resin layer 5 includes a resin composition having the above-mentioned specific composition, and therefore, for example, even when very small contaminants such as debris of an electrode active material and an electrode tab exist in a part to be heat-sealed, such as at an interface between the heat-sealable resin layers, or between the electrode tab and the heat-sealable resin layer, the insulation quality and durability of the battery packaging material are improved.

In the battery packaging material of the second embodiment of the first invention, the adhesive layer 4 includes a resin composition containing an acid-modified polyolefin and an epoxy resin, and in heating of a probe from 40° C. to 220° C. with the probe installed on a surface of the adhesive layer at an end part of the battery packaging material in measurement of the amount of displacement of the probe using a thermomechanical analyzer, the position of the probe does not become lower than an initial value, so that the insulation quality and durability of the battery packaging material are improved.

In the first and second embodiments of the first invention, a polyolefin modified with an unsaturated carboxylic acid or an acid anhydride thereof is preferably used as the acid-modified polyolefin. The acid-modified polyolefin may further be modified with a (meth)acrylic acid ester. The modified polyolefin further modified with a (meth)acrylic acid ester can be obtained by acid-modifying a polyolefin by using an unsaturated carboxylic acid or acid anhydride thereof and a (meth)acrylic acid ester in combination. In the present invention, "(meth)acrylic acid ester" means "acrylic acid ester" or "(meth)acrylic acid ester". The acid-modified polyolefins may be used alone, or may be used in combination of two or more thereof.

The polyolefin to be acid-modified is not particularly limited as long as it is a resin containing at least an olefin as a monomer unit. The polyolefin can be formed from, for example, at least one of polyethylene and polypropylene, and is preferably formed from polypropylene. The polyethylene can be formed from, for example, at least one of homo-polyethylene and an ethylene copolymer. The polypropylene can be formed from, for example, at least one of homo-polypropylene and a propylene copolymer. Examples of the propylene copolymer include copolymers of propylene and other olefins, such as ethylene-propylene copolymers, propylene-butene copolymers and ethylene-propylene-butene copolymers. The ratio of propylene units contained in polypropylene is preferably about 50 mol % or more and 100 mol % or less, more preferably about 80 mol % or more and 100 mol % or less for further improving the insulation quality and durability of the battery packaging material. The ratio of ethylene units contained in polyethylene is preferably about 50 mol % or more and 100 mol % or less, more preferably about 80 mol % or more and 100 mol % or less for further improving the insulation quality and durability of the battery packaging material. Each of the ethylene copolymer and the propylene copolymer may be a random copolymer or a block copolymer. The ethylene copolymer and the propylene copolymer may each be either crystalline or noncrystalline, or may each be a copolymer or mixture of the crystalline and noncrystalline copolymers. The polyolefin may be formed of one homopolymer or copolymer, or may be formed of two or more homopolymers or copolymers.

Examples of the unsaturated carboxylic acid include acrylic acid, methacrylic acid, maleic acid, itaconic acid, fumaric acid and crotonic acid. As the acid anhydride, acid anhydrides of the unsaturated carboxylic acids shown above as an example are preferred, and maleic anhydride and itaconic anhydride are more preferred. The acid-modified polyolefin may be modified with one unsaturated carboxylic acid or acid anhydride thereof, or may be modified with two or more unsaturated carboxylic acids or acid anhydrides thereof.

The (meth)acrylic acid ester is, for example, an esterified product of (meth)acrylic acid and an alcohol with a carbon number of 1 to 30, preferably an esterified product of (meth)acrylic acid and an alcohol with a carbon number of 1 to 20. Specific examples of the (meth)acrylic acid ester include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth)acrylate, octyl (meth)acrylate, dodecyl (meth)acrylate and stearyl (meth)acrylate. In modification of the polyolefin, only one (meth)acrylic acid ester may be used, or two or more (meth)acrylic acid esters may be used.

The ratio of the unsaturated carboxylic acid or an acid anhydride thereof in the acid-modified polyolefin is preferably about 0.1% by mass or more and 30% by mass or less, more preferably about 0.1% by mass or more and 20% by mass or less. When the ratio of the (meth)acrylic acid ester in the acid-modified polyolefin resin falls within the above-mentioned range, the insulation quality and durability of the battery packaging material can be improved.

The ratio of the (meth)acrylic acid ester in the acid-modified polyolefin is preferably about 0.1% by mass or more and 40% by mass or less, more preferably about 0.1% by mass or more and 30% by mass or less. When the ratio of the (meth)acrylic acid ester in the acid-modified polyolefin resin falls within the above-mentioned range, the insulation quality and durability of the battery packaging material can be improved.

The weight average molecular weight of the acid-modified polyolefin is preferably about 6000 or more and 200000 or less, more preferably about 8000 or more and 150000 or less. In the present invention, the weight average molecular weight of the acid-modified polyolefin is a value obtained by performing measurement by gel permeation chromatography (GPC) under the condition of using polystyrene as a standard sample. The melting point of the acid-modified polyolefin is preferably about 50° C. or higher and 120° C. or lower, more preferably about 50° C. or higher and 100° C. or lower. In the present invention, the melting point of the acid-modified polyolefin refers to an endothermic peak temperature in differential scanning calorimetry.

For the acid-modified polyolefin, the method for modifying a polyolefin is not particularly limited, and for example, an unsaturated carboxylic acid or an acid anhydride thereof, or a (meth)acrylic acid ester may be copolymerized with a polyolefin. Copolymerization in this case is random copolymerization, block copolymerization, graft copolymerization (graft modification) or the like, with graft copolymerization being preferred.

The epoxy resin is not particularly limited as long as it is a resin capable of forming a crosslinked structure by epoxy groups existing in the molecule, and a known epoxy resin can be used. In the first embodiment of the first invention, the weight average molecular weight of the epoxy resin may be 50 or more and 2000 or less. In the first and second embodiments, the weight average molecular weight of the epoxy resin is preferably about 100 or more and 1000 or less, more preferably about 200 or more and 800 or less for further improving the insulation quality and durability of the battery packaging material. In the present invention, the weight average molecular weight of the epoxy resin is a value obtained by performing measurement by gel permeation chromatography (GPC) under the condition of using polystyrene as a standard sample.

Specific examples of the epoxy resin include bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The ratio of the epoxy resin in the adhesive layer 4 is preferably 0.5 parts by mass or more and 20 parts by or less, more preferably 1 part by mass or more and 10 parts by mass or less based on 100 parts by mass of the acid-modified polyolefin resin. Accordingly, the insulation quality and durability of the battery packaging material can be improved.

The melting temperature of the adhesive layer 4 is preferably about 180° C. or higher and 260° C. or lower, more preferably about 200° C. or higher and 240° C. or lower. The melting temperature of the adhesive layer 4 is a value obtained by performing measurement using a method conforming to JIS K7196: 2012 "Method for Testing Softening Temperature of Thermoplastic Plastic Film and Sheet by Thermomechanical Analysis", specifically a value obtained by performing measurement using a method as described in examples. The needle penetration temperature is defined as a melting temperature.

The solid content of the adhesive layer 4 is not particularly limited, but it is preferably about 0.5 g/m$^2$ or more and 10 g/m$^2$ or less, more preferably about 0.8 g/m$^2$ or more and 5.2 g/m$^2$ or less for further improving insulation quality and durability. From the same viewpoint, the thickness of the adhesive layer 4 is preferably 0.6 μm or more and 11 μm or less, more preferably 0.9 μm or more and 5.8 μm or less.

[Heat-Sealable Resin Layer 5]

In the battery packaging material of the first invention, the heat-sealable resin layer 5 corresponds to the innermost layer, and during construction of a battery, the heat-sealable resin layer is heat-welded to itself to hermetically seal the battery element.

The resin component to be used in the heat-sealable resin layer 5 in the first invention is not particularly limited as long as it can be heat-welded, and examples thereof include polyolefins and acid-modified polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylene are preferred, with polypropylene being more preferred.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The acid-modified polyolefin may be an acid-modified cyclic polyolefin. The acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with an acid is the same as described above. The carboxylic acid to be used for modification is the same as that used for modification of the acid-modified cycloolefin copolymer.

Among these resin components, polyolefins are preferred, and propylene copolymers are more preferred. Examples of the propylene copolymer include copolymers of propylene and other olefins, such as ethylene-propylene copolymers, propylene-butene copolymers and ethylene-propylene-butene copolymers. The ratio of propylene units contained in polypropylene is preferably about 50 mol % or more and 100 mol % or less, more preferably about 80 mol % or more and 100 mol % or less for further improving the insulation quality and durability of the battery packaging material. The ratio of ethylene units contained in polyethylene is preferably about 50 mol % or more and 100 mol % or less, more preferably about 80 mol % or more and 100 mol % or less for further improving the insulation quality and durability of the battery packaging material. Each of the ethylene copolymer and the propylene copolymer may be a random copolymer or a block copolymer, and a random propylene copolymer is preferred.

Preferably, the heat-sealable resin layer 5 in the first invention contains polypropylene, and includes a layer formed of polypropylene. The heat-sealable resin layer 5 may be formed from one resin component alone, or may be formed from a blend polymer obtained by combining two or more resin components. Further, the heat-sealable resin layer 5 may be formed of only one layer, but may be formed of two or more layers with the same resin component or different resin components.

When the heat-sealable resin layer 5 in the first invention includes a plurality of layers, the innermost layer of the heat-sealable resin layer 5 (on a side opposite to the metal layer 3) is preferably a layer formed by a dry lamination method or extrusion molding. Accordingly, insulation quality and moldability can be further improved.

Preferably, the heat-sealable resin layer 5 in the first invention has fine irregularities on a surface thereof (surface on the innermost layer side). Accordingly, moldability can be further improved. Examples of the method for forming fine irregularities on a surface of the heat-sealable resin layer 5 include a method in which a matting agent shown as an example for the later-described surface coating layer is added to the heat-sealable resin layer 5; and a method in which a cooling roll having irregularities on a surface thereof is abutted against a surface of the heat-sealable resin layer 5 to give a shape. As fine irregularities, the ten-point average roughness of the surface of the heat-sealable resin layer 5 is preferably 0.3 µm or more and 35 µm or less, more preferably 0.3 µm or more and 10 µm or less, still more preferably 0.5 µm or more and 2 µm or less. The ten-point average roughness is a value obtained by performing measurement under conditions of an objective lens magnification of 50 and no cutoff using Laser Microscope VK-9710 manufactured by KEYENCE CORPORATION in a method conforming to JIS B0601: 1994.

While the thickness of the heat-sealable resin layer 5 in the first invention is not particularly limited as long as a function as a heat-sealable resin layer is performed, it is, for example, 10 µm or more and 40 µm or less, preferably 15 µm or more and 40 µm or less for further improving insulation quality and durability.

[First Insulating Layer 51]

In the second invention, the first insulating layer 51 is a layer provided between the metal layer 3 and the heat-sealable resin layer 41 together with the later-described second insulating layer 52 for improving the insulation quality and durability of the battery packaging material. The first insulating layer 51 is laminated on the metal layer 3 side, and the second insulating layer 52 is laminated on the heat-sealable resin layer 41 side.

The melting temperature of the first insulating layer 51 is 200° C. or higher. The battery packaging material of the second invention includes the first insulating layer 51 having such a high melting temperature, and also the second insulating layer 52 having a melting temperature lower than that of the first insulating layer 51, and therefore, for example, even when very small contaminants such as debris of an electrode active material and an electrode tab exist in a part to be heat-sealed, such as at an interface between the heat-sealable resin layers, or between the electrode tab and the heat-sealable resin layer, the insulation quality and durability of the battery packaging material are improved.

While the melting temperature of the first insulating layer 51 is not particularly limited as long as it is 200° C. or higher, it is preferably about 200° C. or higher and 260° C. or lower, more preferably about 200° C. or higher and 240° C. or lower. In the second invention, the melting temperature is a value obtained by performing measurement using a method conforming to JIS K7196: 2012 "Method for Testing Softening Temperature of Thermoplastic Plastic Film and Sheet by Thermomechanical Analysis", specifically a value obtained by performing measurement using a method as described in examples. The needle penetration temperature is defined as a melting temperature.

As described above, in the production process of batteries, very small contaminants such as debris of an electrode active material and an electrode tab may stick to the surface of the heat-sealable resin layer, and accordingly thin parts and through-holes may be generated in the heat-sealable resin layer, leading to deterioration of insulation quality. On the other hand, in the battery packaging material of the second invention, the first insulating layer 51 having a specific melting temperature, and also the second insulating layer 52 having a melting temperature lower than the melting temperature of the first insulating layer 51 are formed, and therefore the battery packaging material has high heat resistance and mechanical strength in application of heat during heat-sealing, and high flexibility, so that generation of fine cracks due to stress associated with bending or the like can be effectively suppressed. Therefore, even when fine cracks that are easily generated at thin parts, through-holes that are generated by contaminants etc., voids resulting from foaming of an electrolytic solution in the heat-sealable resin layer which occurs in the case where the sealant layer is heat-sealed while catching the electrolytic solution, or the like are formed in the heat-sealable resin layer 41, the electrolytic solution can be prevented from coming into direct contact with the metal layer by the first insulating layer 51 and the second insulating layer 52, so that the metal layer 3 is protected. Even when the heat-sealable resin layer 41 catches contaminants etc., deterioration of the insulation quality of the battery packaging material by contaminants can be prevented by a combination of the first insulating layer 51 and the second insulating layer 52, which has high heat resistance and high flexibility.

The resin that forms the first insulating layer 51 is not particularly limited as long as it has the aforementioned melting temperature. Preferably, the first insulating layer 51 is formed of an acid-modified polyolefin and an epoxy resin for further improving insulation quality and durability by using the first insulating layer 51 in combination with the second insulating layer 52.

As the acid-modified polyolefin, a polyolefin modified with an unsaturated carboxylic acid or acid anhydride thereof is preferably used. The acid-modified polyolefin may further be modified with a (meth)acrylic acid ester. The modified polyolefin further modified with a (meth)acrylic acid ester can be obtained by acid-modifying a polyolefin by using an unsaturated carboxylic acid or acid anhydride thereof and a (meth)acrylic acid ester in combination.

The polyolefin to be acid-modified is not particularly limited as long as it is a resin containing at least an olefin as a monomer unit. The polyolefin can be formed from, for example, at least one of polyethylene and polypropylene, and is preferably formed from polypropylene. The polyethylene can be formed from, for example, at least one of homo-polyethylene and an ethylene copolymer. The polypropylene can be formed from, for example, at least one of homo-polypropylene and a propylene copolymer. Examples of the propylene copolymer include copolymers of propylene and other olefins, such as ethylene-propylene copolymers, propylene-butene copolymers and ethylene-propylene-butene copolymers. The ratio of propylene units contained in polypropylene is preferably about 50 mol % or more and 100 mol % or less, more preferably about 80 mol % or more and 100 mol % or less for further improving the insulation quality and durability of the battery packaging material. The ratio of ethylene units contained in polyethylene is preferably about 50 mol % or more and 100 mol % or less, more preferably about 80 mol % or more and 100 mol % or less for further improving the insulation quality and durability of the battery packaging material. Each of the ethylene copolymer and the propylene copolymer may be a random copolymer or a block copolymer. The ethylene copolymer and the propylene copolymer may each be either crystalline or noncrystalline, or may each be a copolymer or mixture of the crystalline and noncrystalline copolymers. The polyolefin may be formed of one homopolymer or copolymer, or may be formed of two or more homopolymers or copolymers.

Examples of the unsaturated carboxylic acid include acrylic acid, methacrylic acid, maleic acid, itaconic acid, fumaric acid and crotonic acid. As the acid anhydride, acid anhydrides of the unsaturated carboxylic acids shown above as an example are preferred, and maleic anhydride and itaconic anhydride are more preferred. The acid-modified polyolefin may be modified with one unsaturated carboxylic acid or acid anhydride thereof, or may be modified with two or more unsaturated carboxylic acids or acid anhydrides thereof.

The (meth)acrylic acid ester is, for example, an esterified product of (meth)acrylic acid and an alcohol with a carbon number of 1 to 30, preferably an esterified product of (meth)acrylic acid and an alcohol with a carbon number of 1 to 20. Specific examples of the (meth)acrylic acid ester include methyl (meth)acrylate, ethyl (meth)acrylate, propyl (meth)acrylate, butyl (meth)acrylate, hexyl (meth)acrylate, octyl (meth)acrylate, decyl (meth)acrylate, lauryl (meth) acrylate, octyl (meth)acrylate, dodecyl (meth)acrylate and stearyl (meth)acrylate. In modification of the polyolefin, only one (meth)acrylic acid ester may be used, or two or more (meth)acrylic acid esters may be used.

The ratio of the unsaturated carboxylic acid or an acid anhydride thereof in the acid-modified polyolefin is preferably about 0.1% by mass or more and 30% by mass or less, more preferably about 0.1% by mass or more and 20% by mass or less. When the ratio of the (meth)acrylic acid ester in the acid-modified polyolefin resin falls within the above-mentioned range, the insulation quality and durability of the battery packaging material can be improved.

The ratio of the (meth)acrylic acid ester in the acid-modified polyolefin is preferably about 0.1% by mass or more and 40% by mass or less, more preferably about 0.1% by mass or more and 30% by mass or less. When the ratio of the (meth)acrylic acid ester in the acid-modified polyolefin resin falls within the above-mentioned range, the insulation quality and durability of the battery packaging material can be improved.

The weight average molecular weight of the acid-modified polyolefin is preferably about 6000 or more and 200000 or less, more preferably about 8000 or more and 150000 or less. In the second invention, the weight average molecular weight of the acid-modified polyolefin is a value obtained by performing measurement by gel permeation chromatography (GPC) under the condition of using polystyrene as a standard sample. The melting point of the acid-modified polyolefin is preferably about 50° C. or higher and 160° C. or lower, more preferably about 50° C. or higher and 120° C. or lower. In the second invention, the melting point of the acid-modified polyolefin refers to an endothermic peak temperature in differential scanning calorimetry.

For the acid-modified polyolefin, the method for modifying a polyolefin is not particularly limited, and for example, an unsaturated carboxylic acid or an acid anhydride thereof, or a (meth)acrylic acid ester may be copolymerized with a polyolefin. Copolymerization in this case is random copolymerization, block copolymerization, graft copolymerization (graft modification) or the like, with graft copolymerization being preferred.

The epoxy resin is not particularly limited as long as it is a resin capable of forming a crosslinked structure by epoxy groups existing in the molecule, and a known epoxy resin can be used.

Specific examples of the epoxy resin include bisphenol A diglycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The ratio of the epoxy resin in the first insulating layer 51 is preferably 0.5 parts by mass or more and 20 parts by or less, more preferably 1 part by mass or more and 10 parts by mass or less based on 100 parts by mass of the acid-modified polyolefin resin. Accordingly, the insulation quality and durability of the battery packaging material can be improved.

The thickness of the first insulating layer 51 is not particularly limited, but it is preferably 10 μm or less, more preferably about 1 μm or more and 5 μm or less for further improving insulation quality and durability in cooperation with the second insulating layer 52.

[Second Insulating Layer 52]

In the second invention, the second insulating layer 52 is a layer provided between the metal layer 3 and the heat-sealable resin layer 41 together with the first insulating layer 51 for improving the insulation quality and durability of the battery packaging material. The second insulating layer 52 is laminated on the heat-sealable resin layer 41 side, and the first insulating layer 51 is laminated on the metal layer 3 side.

The melting temperature of the second insulating layer 52 is lower than the melting temperature of the first insulating layer 51. Since the melting temperature of the second insulating layer 52 is set lower than the melting temperature of the first insulating layer 51, a combination of the first insulating layer 51 and the second insulating layer 52 exhibits high durability and high flexibility, and deterioration of the insulation quality of the battery packaging material by contaminants can be effectively prevented.

While the melting temperature of the second insulating layer 52 is not particularly limited as long as it is lower than the melting temperature of the first insulating layer 51, it is preferably 150° C. or higher, more preferably about 150° C. or higher and 180° C. or lower.

The resin that forms the second insulating layer 52 is not particularly limited as long as it has the aforementioned melting temperature. Preferably, the second insulating layer 52 is formed of a polyolefin for further improving insulation quality and durability by using the second insulating layer 52 in combination with the first insulating layer 51.

The polyolefin is not particularly limited as long as it is a resin containing at least an olefin as a monomer unit. The polyolefin can be formed from, for example, at least one of polyethylene and polypropylene, and is preferably formed from polypropylene. The polyethylene can be formed from, for example, at least one of homo-polyethylene and an ethylene copolymer. The polypropylene can be formed from, for example, at least one of homo-polypropylene and a propylene copolymer. Examples of the propylene copolymer include copolymers of propylene and other olefins, such as ethylene-propylene copolymers, propylene-butene copolymers and ethylene-propylene-butene copolymers. The ratio of propylene units contained in polypropylene is preferably about 50 mol % or more and 100 mol % or less, more preferably about 80 mol % or more and 100 mol % or less for further improving the insulation quality and durability of the battery packaging material. The ratio of ethylene units contained in polyethylene is preferably about 50 mol % or more and 100 mol % or less, more preferably about 80 mol % or more and 100 mol % or less for further improving the insulation quality and durability of the battery packaging material. Each of the ethylene copolymer and the propylene copolymer may be a random copolymer or a block copolymer, and a block propylene copolymer is preferred. The ethylene copolymer and the propylene copolymer may each be either crystalline or noncrystalline, or may each be a copolymer or mixture of the crystalline and noncrystalline copolymers. The polyolefin may be formed of one homopolymer or copolymer, or may be formed of two or more homopolymers or copolymers.

The melting point of the polyolefin is preferably about 120° C. or higher and 180° C. or lower, more preferably about 140° C. or higher and 180° C. or lower. In the second invention, the melting point of the polyolefin refers to an endothermic peak temperature in differential scanning calorimetry.

The thickness of the second insulating layer 52 is not particularly limited, but it is preferably about 10 μm or more and 50 μm or less, more preferably about 15 μm or more and 40 μm or less for further improving insulation quality and durability in cooperation with the first insulating layer 51.

[Adhesive Layer 6]

In the second invention, the adhesive layer 6 is a layer provided between the first insulating layer 51 and the second insulating layer 52 as necessary for improving adhesion between these layers.

The adhesive layer 6 is formed from an adhesive capable of bonding the first insulating layer 51 and the second insulating layer 52. The resin that forms the adhesive layer 6 is not particularly limited, but it is preferably a polyolefin. Examples of the polyolefin include those shown as an example for the second insulating layer 52. The polyolefin that forms the adhesive layer 6 is not particularly limited, but it is preferably a random propylene copolymer.

While the thickness of the adhesive layer 6 is not particularly limited as long as a function as an adhesive layer is performed, it is, for example, about 20 μm or less, preferably about 2 μm or more and 10 μm or less.

[Adhesive Layer 7]

In the battery packaging materials of the second invention, the adhesive layer 7 is a layer provided between the metal layer 3 and the first insulating layer 51 as necessary for strongly bonding these layers.

The adhesive layer 7 is formed from an adhesive capable of bonding the metal layer 3 and the first insulating layer 51. The bonding mechanism, the kind of the adhesive agent component, and so on for the adhesive agent to be used for formation of the adhesive layer 7 are the same as those for the adhesive agent layer 2. The adhesive component to be used in the adhesive layer 7 is preferably an acid-modified polyolefin, further preferably a carboxylic acid-modified polyolefin, especially preferably carboxylic acid-modified polypropylene.

While the thickness of the adhesive layer 7 is not particularly limited as long as a function as an adhesive layer is performed, it is, for example, about 1 μm or more and 10 μm or less, preferably about 1 μm or more and 5 μm or less.

[Heat-Sealable Resin Layer 41]

In the battery packaging material of the second invention, the heat-sealable resin layer 41 corresponds to the innermost layer, and during construction of a battery, the heat-sealable resin layer is heat-welded to itself to hermetically seal the battery element.

The resin component to be used in the heat-sealable resin layer 41 is not particularly limited as long as it can be heat-welded, and examples thereof include polyolefins and acid-modified polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylene are preferred, with polypropylene being more preferred.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The acid-modified polyolefin may be an acid-modified cyclic polyolefin. The acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with an acid is the same as described above. The carboxylic acid to be used for modification is the same as that used for modification of the acid-modified cycloolefin copolymer.

Among these resin components, polyolefins are preferred, and propylene copolymers are more preferred. Examples of the propylene copolymer include copolymers of propylene and other olefins, such as ethylene-propylene copolymers, propylene-butene copolymers and ethylene-propylene-butene copolymers. The ratio of propylene units contained in polypropylene is preferably about 50 mol % or more and 100 mol % or less, more preferably about 80 mol % or more and 100 mol % or less for further improving the insulation quality and durability of the battery packaging material. The ratio of ethylene units contained in polyethylene is preferably about 50 mol % or more and 100 mol % or less, more preferably about 80 mol % or more and 100 mol % or less for further improving the insulation quality and durability of the battery packaging material. Each of the ethylene copolymer and the propylene copolymer may be a random copolymer or a block copolymer, and a random propylene copolymer is preferred.

The heat-sealable resin layer 41 may be formed from one resin component alone, or may be formed from a blend polymer obtained by combining two or more resin components. Further, the heat-sealable resin layer 41 may be formed of only one layer, but may be formed of two or more layers with the same resin component or different resin components.

When the heat-sealable resin layer 41 includes a plurality of layers, the innermost layer of the heat-sealable resin layer 41 (on a side opposite to the metal layer 3) is preferably a layer formed by a dry lamination method or extrusion molding. Accordingly, insulation quality and moldability can be further improved.

The melting temperature of the heat-sealable resin layer 41 is preferably lower than the melting temperature of the second insulating layer 52. The melting temperature of the heat-sealable resin layer 41 is preferably about 80° C. or higher and 160° C. or lower, more preferably about 100° C. or higher and 140° C. or lower.

Preferably, the heat-sealable resin layer 41 has fine irregularities on a surface thereof (surface on the innermost layer side). Accordingly, moldability can be further improved. Examples of the method for forming fine irregularities on a surface of the heat-sealable resin layer 41 include a method in which a matting agent shown as an example for the later-described surface coating layer is added to the heat-sealable resin layer 41; and a method in which a cooling roll having irregularities on a surface thereof is abutted against a surface of the heat-sealable resin layer 41 to give a shape.

While the thickness of the heat-sealable resin layer 41 is not particularly limited as long as a function as a heat-sealable resin layer is performed, it is, for example, about 10 µm or more and 40 µm or less, preferably about 15 µm or more and 40 µm or less.

[Surface Coating Layer]

In the battery packaging material of the present invention, a surface coating layer (not illustrated) may be provided on the base material layer 1 (on the base material layer 1 on a side opposite to the metal layer 3) as necessary for the purpose of, for example, improving designability, electrolytic solution resistance, scratch resistance and moldability. The surface coating layer is a layer that is situated at an outermost layer when a battery is assembled.

The surface coating layer can be formed from, for example, polyvinylidene chloride, a polyester resin, a urethane resin, an acrylic resin, an epoxy resin, or the like. Preferably, the surface coating layer is formed from a two-liquid curable resin among the resins described above. Examples of the two-liquid curable resin that forms the surface coating layer include two-liquid curable urethane resins, two-liquid curable polyester resins and two-liquid curable epoxy resins. The surface coating layer may contain a matting agent.

Examples of the matting agent include fine particles having a particle size of about 0.5 nm or more and 5 µm or less. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acryl, crosslinked styrene, crosslinked polyethylene, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The method for forming a surface coating layer is not particularly limited, and examples thereof include a method in which a two-liquid curable resin for forming a surface coating layer is applied to one of the surfaces of the base material layer 1. In the case where a matting agent is blended, the matting agent may be added to and mixed with the two-liquid curable resin, followed by applying the mixture.

While the thickness of the surface coating layer is not particularly limited as long as the above-mentioned function as a surface coating layer is performed, it is, for example, about 0.5 µm or more and 10 µm or less, preferably about 1 µm or more and 5 or less.

3. Method for Producing Battery Packaging Material

The method for producing a battery packaging material of the first invention is not particularly limited as long as a laminate including layers each having a predetermined composition is obtained, and a method can be employed which includes a lamination step of preparing a laminate including at least the base material layer 1, the metal layer 3, the adhesive layer 4 and the heat-sealable resin layer 5, the adhesive layer 4 being formed from a resin composition containing an acid-modified polyolefin having a melting point of 50° C. or higher and 120° C. or lower and an epoxy resin having a weight average molecular weight of 50 to 2000. That is, by laminating the layers while using as the adhesive layer 4 an adhesive layer as described in the section "2. layers forming battery packaging material", the battery packaging material of the present invention can be produced.

One example of the method for producing a battery packaging material of the first invention is as follows. First, a laminate including the base material layer 1, the adhesive agent layer 2 and the metal layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the metal layer 3, which is subjected to a chemical conversion treatment at a surface as necessary, using a coating method such as an extrusion method, a gravure coating method or a roll coating method, and dried, the metal layer 3 or the base material layer 1 is then laminated, and the adhesive agent layer 2 is cured.

Then, the adhesive layer 4 and the heat-sealable resin layer 5 are laminated on the metal layer 3 of the laminate A. When the adhesive layer 4 and the heat-sealable resin layer 5 are laminated on the metal layer 3, mention is made of, for example, (1) a method in which the adhesive layer 4 and the heat-sealable resin layer 5 are co-extruded to be laminated on the metal layer 3 of the laminate A (co-extrusion lamination method); (2) a method in which the adhesive layer 4 and the heat-sealable resin layer 5 are laminated to form a laminate separately, and the laminate is laminated on the metal layer 3 of the laminate A by a thermal lamination method; (3) a dry lamination method in which the resin composition for forming the adhesive layer 4 is applied onto the metal layer 3 of the laminate A by a coating method such as a gravure coating method or a roll coating method, drying the resin composition, then laminating the heat-sealable resin layer, and curing the adhesive layer 4; and (4) a method in which the melted adhesive layer 4 is poured between the metal layer 3 of the laminate A and the heat-sealable resin layer 5 formed in a sheet shape beforehand, and simultaneously the laminate A and the heat-sealable resin layer 5 are bonded together with the adhesive layer 4 interposed therebetween (sandwich lamination). Among these methods, the method (3) is preferred. When the method (3) is employed, it is preferable that the resin composition for forming the adhesive layer 4 is laminated on the metal layer 3, and then dried at a temperature of 60° C. or higher and 120° C. or lower. When the heat-sealable resin layer includes a plurality of layers, the innermost layer of the heat-sealable resin layer is preferably a layer formed by a dry lamination method or extrusion molding.

When a surface coating layer is provided, the surface coating layer is laminated on a surface of the base material layer 1 on a side opposite to the metal layer 3. The surface coating layer can be formed by, for example, coating a surface of the base material layer 1 with the resin that forms the surface coating layer. The order of the step of laminating the metal layer 3 on a surface of the base material layer 1 and the step of laminating the surface coating layer on a surface of the base material layer 1 is not particularly limited. For example, the surface coating layer may be formed on a surface of the base material layer 1, followed by forming the metal layer 3 on a surface of the base material layer 1 on a side opposite to the surface coating layer.

A laminate including the surface coating layer provided as necessary, the base material layer 1, the adhesive agent layer 2 provided as necessary, the metal layer 3 subjected to a chemical conversion treatment at a surface as necessary, the adhesive layer 4, and the heat-sealable resin layer 5 in this order is formed in the manner described above, and the laminate may be further subjected to a heating treatment of a hot roll contact type, a hot air type, a near- or far-infrared type, or the like for strengthening the adhesion of the adhesive agent layer 2 and the adhesive layer 4 provided as necessary. As conditions for such a heating treatment, for example, the temperature is 150° C. or more and 250° C. or less, and the time is 1 minute to 5 minutes.

The method for producing a battery packaging material of the second invention is not particularly limited as long as a laminate including layers each having a predetermined composition is obtained, and a method can be employed which includes the step of preparing a laminate including at least a base material layer, a metal layer, a first insulating layer, a second insulating layer and a heat-sealable resin layer, wherein the melting temperature of the first insulating layer is 200° C. or higher, and the melting temperature of the second insulating layer is set lower than the melting temperature of the first insulating layer.

That is, by laminating the layers while using as the first insulating layer 51 and the second insulating layer 52 the layers described in the section "2. layers forming battery packaging material", the battery packaging material of the second invention can be produced.

One example of the method for producing a battery packaging material of the second invention is as follows. First, a laminate including the base material layer 1, the adhesive agent layer 2 and the metal layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the metal layer 3, which is subjected to a chemical conversion treatment at a surface as necessary, using a coating method such as an extrusion method, a gravure coating method or a roll coating method, and dried, the metal layer 3 or the base material layer 1 is then laminated, and the adhesive agent layer 2 is cured.

Then, at least the first insulating layer 51, the second insulating layer 52 and the heat-sealable resin layer 4 are laminated on the metal layer 3 of the laminate A. The method for laminating the first insulating layer 51 and the second insulating layer 52 on the metal layer 3 is not limited, and examples thereof include a method in which a resin for forming the first insulating layer 51 and a resin for forming the second insulating layer 52 are sequentially applied onto the metal layer 3. A resin film for forming the first insulating layer 51 and the resin film for forming the second insulating layer 52 may be laminated.

When the adhesive layer 6 is provided between the first insulating layer 51 and the second insulating layer 52, a resin for forming the adhesive layer 6 may be applied onto the first adhesive layer 51, followed by laminating the second insulating layer 52. A laminate obtained by laminating the adhesive layer 6 on the second insulating layer 52 beforehand may be laminated to the first insulating layer 51. When the adhesive layer 7 is provided between the metal layer 3 and the first insulating layer 51, a resin for forming the adhesive layer 7 may be applied onto the metal layer 3, followed by laminating the first insulating layer 51 etc.

Finally, the heat-sealable resin layer 4 is laminated on the second insulating layer 52 to obtain the battery packaging material of the second invention. A two-layer resin film obtained by laminating the second insulating layer 52 and the heat-sealable resin layer 4 may be laminated on the first adhesive layer 51.

When a surface coating layer is provided, the surface coating layer is laminated on a surface of the base material layer 1 on a side opposite to the metal layer 3. The surface coating layer can be formed by, for example, coating a surface of the base material layer 1 with the resin that forms the surface coating layer. The order of the step of laminating the metal layer 3 on a surface of the base material layer 1 and the step of laminating the surface coating layer on a surface of the base material layer 1 is not particularly limited. For example, the surface coating layer may be formed on a surface of the base material layer 1, followed by forming the metal layer 3 on a surface of the base material layer 1 on a side opposite to the surface coating layer.

A laminate including the surface coating layer provided as necessary, the base material layer 1, the adhesive agent layer 2, the metal layer 3 subjected to a chemical conversion treatment as necessary, the adhesive layer 7 provided as necessary, the first insulating layer 51, the adhesive layer 6 provided as necessary, the second insulating layer 52 and the heat-sealable resin layer 4 is formed in the manner described above, and the laminate may be further subjected to a heating treatment of a hot roll contact type, a hot air type, a near- or far-infrared type, or the like for strengthening the adhesion of the adhesive agent layer 2 and the adhesive layer 5 provided as necessary. As conditions for such a heating treatment, for example, the temperature is 150° C. or more and 250° C. or less, and the time is 1 minute or more and 5 minutes or less.

In the battery packaging material of the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging material of the present invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material of the present invention such that a flange portion (region where a heat-sealable resin layer is in contact with itself) can be formed on the periphery of the battery element while a metal terminal connected to each of the positive electrode and the negative electrode protrudes to the outside, and the heat-sealable resin layer at the flange portion is heat-sealed with itself, thereby providing a battery using a battery packaging material. When the battery element is stored using the battery packaging material of the present invention, the battery packaging material of the present invention is used such that the heat-sealable resin portion is on the inner side (surface in contact with the battery element).

The battery packaging material of the present invention may be used for either a primary battery or a secondary battery, but is preferably used for a secondary battery. The type of a secondary battery to which the battery packaging material of the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material of the present invention is applied include lithium ion batteries and lithium ion polymer batteries.

EXAMPLES

Hereinafter, the present invention will be described in detail below by showing Examples and Comparative Examples. It is to be noted that the present invention is not limited to examples. The weight average molecular weight of the resin is a value obtained by performing measurement by gel permeation chromatography (GPC) under the condition of using polystyrene as a standard sample. The melting temperature is a needle penetration temperature as measured in a needle penetration mode in TMA in accordance with JIS K7196: 2012. As an apparatus, EXSTAR 6000 manufactured by Seiko Instruments Inc. was used. The melting point of the main agent in the adhesive layer was measured using a differential scanning calorimeter in accordance with JIS K7121: 2012.

Examples 1A to 12A and Comparative Examples 1A to 17A

A metal layer formed of an aluminum foil (thickness: 35 µm) subjected to a chemical conversion treatment at both surfaces was laminated on a nylon film (thickness: 25 µm) as a base material layer was laminated using a dry lamination method. Specifically, a two-liquid urethane adhesive (polyol compound and aromatic isocyanate-based compound) was applied to one surface of the aluminum foil, so that an adhesive agent layer (thickness: 3 µm) was formed on the metal layer. The adhesive agent layer on the metal layer and the base material layer were then laminated, and an aging treatment was performed at 40° C. for 24 hours to prepare a laminate of a base material layer, an adhesive agent layer and a metal layer. The chemical conversion treatment of the aluminum foil used as the metal layer was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry mass), and performing baking for 20 seconds under such conditions that the film temperature was 180° C. or higher.

Next, a resin composition containing a main agent and a curing agent as described in Table 1A was applied to the other surface of the metal layer in the obtained laminate in such a manner that the coating amount (dry mass) was as described in Table 1A, and the resin composition was dried at 80° C. for 60 seconds to form an adhesive layer. Next, a polypropylene film (thickness: 35 µm) was laminated onto the adhesive layer by a dry lamination method to form a heat-sealable resin layer. In Examples 1A to 12A and Comparative Examples 1A to 16A, a laminate including a base material layer, an adhesive agent layer, a metal layer, an adhesive layer and a heat-sealable resin layer in this order was obtained in the above steps. In Comparative Example 17, polypropylene was extruded and molded on the metal layer to obtain a laminate including a base material layer, an adhesive agent layer, a metal layer and a heat-sealable resin layer in this order. The obtained laminates were left standing at 70° C. for 24 hours to be aged, thereby obtaining battery packaging materials of Examples 1A to 12A and Comparative Examples 1A to 17A. The thickness of the adhesive layer calculated from the coating amount and the density is shown in Table 1A.

<Evaluation of Durability>

Figure 5:
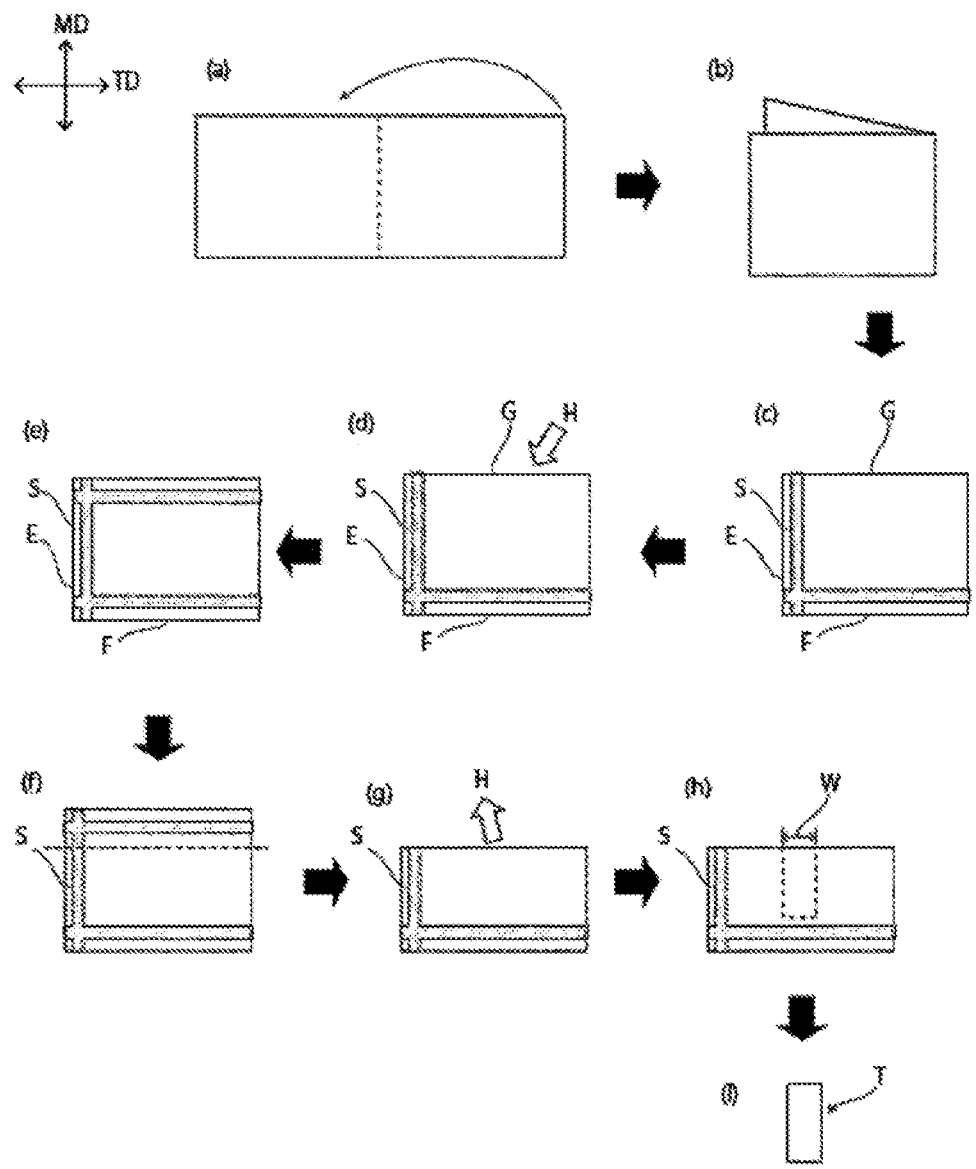
FIG. 5 is a schematic view for illustrating a method for "evaluation of durability" in an example.

Each battery packaging material obtained as described above was cut to a size of 60 mm (machine direction (MD): longitudinal direction)×150 mm (traverse direction (TD): lateral direction) as shown in the schematic view in FIG. 5 (FIG. 5(a)). Next, the cut battery packaging material was folded in half with two parts of the heat-sealable resin layer facing each other in the traverse direction (TD) (FIG. 5(b)). Next, the folded battery packaging material was heat-welded on one side E of the sides facing each other in the traverse direction (TD) and on one side F in the machine direction (MD) (width of heat-welded part S: 7 mm) to prepare a bag-shaped battery packaging material opened at one side in the TD direction (opening G in FIG. 5(c)). As conditions for heat-welding, the temperature was 190° C., the surface pressure was 1.0 MPa, and the heating and pressurization time was 3 seconds. Next, 3 g of an electrolytic solution H was injected from the opening G as in FIG. 5(d). Next, the opening G was heat-welded to a width of 7 mm under the same conditions as described above (FIG. 5(e)). The electrolytic solution H was obtained by mixing lithium phosphate hexafluoride with a solution formed by mixing ethylene carbonate, diethyl carbonate and dimethyl carbonate at a volume ratio of 1:1:1. Next, the battery packaging material was left standing in a thermostatic bath at 85° C. for 24 hours while a part of the battery packaging material where the opening G was situated faced upward (state in FIG. 5(e)).

Next, each battery packaging material was taken out from the thermostatic bath, and cut out on the electrolytic solution H-injected side as shown in FIG. 5(f) (position of broken line in FIG. 5(f)), and the battery packaging material was unsealed to remove the electrolytic solution H (FIG. 5(g)). Next, a part of the battery packaging material, which had a width W of 15 mm in the traverse direction (TD), was cut to a strip (broken line part in FIG. 5(h)) to obtain a test piece T (FIG. 5(I)). The obtained test piece T was delaminated between the heat-sealable resin layer and the metal layer, and the heat-sealable resin layer and the metal layer were drawn at a speed of 50 mm/minute using a tensile tester (AGS-50D (trade name) manufactured by Shimadzu Corporation), and the peeling strength (N/15 mm) of the test piece was measured (peeling strength after durability test). For the test piece T obtained by cutting the battery packaging material obtained in each of Examples 1A to 12A and Comparative Examples 1A to 17A to a width of 15 mm, the peeling strength was measured (peeling strength before durability test) in the same manner as described above. The results are shown in Table 1A. In delamination of the test piece T between the heat-sealable resin layer and the metal layer, the adhesive layer situated between these layers is laminated on one or both of the heat-sealable resin layer and the metal layer.

<Evaluation of Insulation Quality to Caught Contaminants>

Figure 6:
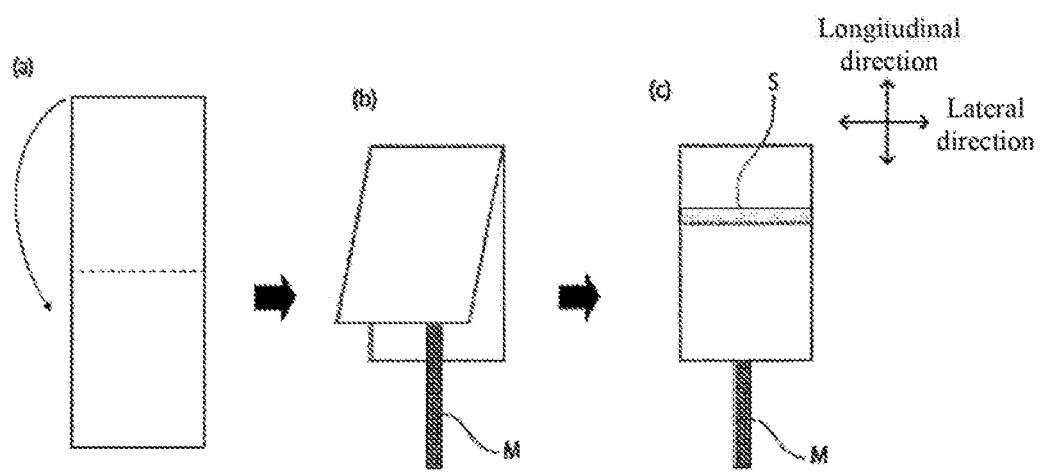
FIG. 6 is a schematic view for illustrating a method for "evaluation of insulation quality against caught contaminants" in an example.

As shown in in FIG. 6, each battery packaging material obtained as described above was cut to a size of 60 mm (lateral direction)×150 mm (longitudinal direction) to obtain a test piece (FIG. 6(a)). Next, the test piece was folded with the short sides facing each other, and disposed in such a manner that the surfaces of two parts of the heat-sealable resin layer of the test piece faced each other. Next, a wire M of 25 μmy was inserted between the mutually facing surfaces of the heat-sealable resin layer (FIG. 6(b)). Next, in this state, the heat-sealable resin layers were heat-sealed with each other in a direction orthogonal to the length direction of the battery packaging material (FIG. 6(c), heat-welded part S) using a heat sealer including a flat heat plate having a width of 7 mm on both upper and lower sides. Here, the heat-sealable resin layers were heat-sealed from above a part where the wire M was situated, so that the heat-sealable resin layer was heat-sealed to the wire M. Next, a positive pole of a tester was connected to the wire M, and a negative pole of the tester was connected to one of the battery packaging materials. Here, for the negative pole of the tester, a crocodile clip was inserted so as to reach the aluminum layer from the base material layer side of the battery packaging material, so that the negative pole of the tester and the aluminum foil were electrically connected. Next, a voltage of 100 V was applied between the testers, and a time (seconds) until a short circuit occurred was measured. The results are shown in Table 1A.

TABLE 1A

| | Adhesive layer | | | |
|---|---|---|---|---|
| | Main agent | | Curing agent | Melting temperature |
| | Parts by mass | Melting point (° C.) | Parts by mass | (° C.) |
| Example 1A | Acid-modified | 50 | Epoxy resin | 220 |
| Example 2A | polypropylene | | (weight average molecular | |
| Example 3A | 100 Parts by mass | | weight: 500) | |
| Example 4A | | | 2 parts by mass | |
| Example 5A | Acid-modified | 60 | Epoxy resin | 230 |
| Example 6A | polypropylene | | (weight average molecular | |
| Example 7A | 100 Parts by mass | | weight: 500) | |
| Example 8A | | | 2 parts by mass | |
| Example 9A | Acid-modified | 70 | Epoxy resin | 230 |
| Example 10A | polypropylene | | (weight average molecular | |
| Example 11A | 100 Parts by mass | | weight: 500) | |
| Example 12A | | | 2 parts by mass | |
| Comparative Example 1A | Acid-modified | 130 | Epoxy resin | 150 |
| Comparative Example 2A | polypropylene | | (weight average molecular | |
| Comparative Example 3A | 100 Parts by mass | | weight: 500) | |
| Comparative Example 4A | | | 2 parts by mass | |
| Comparative Example 5A | Acid-modified | 60 | Epoxy resin | 80 |
| Comparative Example 6A | polypropylene | | (weight average molecular | |
| Comparative Example 7A | 100 Parts by mass | | weight: 2500) | |
| Comparative Example 8A | | | 2 parts by mass | |
| Comparative Example 9A | Acid-modified | 60 | Isocyanate compound | 70 |
| Comparative Example 10A | polypropylene | | 10 parts by mass | |
| Comparative Example 11A | 100 Parts by mass | | | |
| Comparative Example 12A | | | | |
| Comparative Example 13A | Polyol | 60 | Isocyanate compound | 70 |
| Comparative Example 14A | 100 Parts by mass | | 10 parts by mass | |
| Comparative Example 15A | | | | |
| Comparative Example 16A | | | | |
| Comparative Example 17A | — | — | — | — |

| | Adhesive layer | | Evaluation of durability Peeling strength (N/15 mm) | | Evaluation of insulation quality Time until short-circuit occurred (seconds) |
|---|---|---|---|---|---|
| | Coating amount (g/m²) | Thickness (μm) | Before test | After test | |
| Example 1A | 0.7 | 0.8 | 4.3 | 5.3 | 38 |
| Example 2A | 1.0 | 1.1 | 8.2 | 81 | 45 |
| Example 3A | 3.0 | 3.3 | 8.6 | 8.3 | 46 |
| Example 4A | 5.0 | 5.6 | 9.1 | 8.6 | 52 |
| Example 5A | 0.7 | 0.8 | 4.5 | 5.6 | 39 |
| Example 6A | 1.0 | 1.1 | 8.2 | 8.1 | 43 |
| Example 7A | 3.0 | 3.3 | 8.7 | 8.3 | 49 |
| Example 8A | 5.0 | 5.6 | 8.9 | 8.6 | 52 |
| Example 9A | 0.7 | 0.8 | 4.2 | 5.1 | 39 |
| Example 10A | 1.0 | 1.1 | 8.8 | 8.1 | 48 |
| Example 11A | 3.0 | 3.3 | 8.4 | 8.3 | 49 |
| Example 12A | 5.0 | 5.6 | 8.6 | 8.1 | 51 |

TABLE 1A-continued

| | | | | | |
|---|---|---|---|---|---|
| Comparative Example 1A | 0.7 | 0.8 | 3.6 | 3.1 | 19 |
| Comparative Example 2A | 1.0 | 1.1 | 4.3 | 4.3 | 23 |
| Comparative Example 3A | 3.0 | 3.3 | 4.5 | 4.1 | 22 |
| Comparative Example 4A | 5.0 | 5.6 | 4.2 | 3.9 | 25 |
| Comparative Example 5A | 0.7 | 0.8 | 1.2 | 0.2 | 19 |
| Comparative Example 6A | 1.0 | 1.1 | 2 | 0.5 | 21 |
| Comparative Example 7A | 3.0 | 3.3 | 2.3 | 0.4 | 22 |
| Comparative Example 8A | 5.0 | 5.6 | 2.5 | 0.3 | 25 |
| Comparative Example 9A | 0.7 | 0.8 | 3.8 | 0.5 | 20 |
| Comparative Example 10A | 1.0 | 1.1 | 7.2 | 1.3 | 21 |
| Comparative Example 11A | 3.0 | 3.3 | 7.3 | 1.2 | 23 |
| Comparative Example 12A | 5.0 | 5.6 | 7.6 | 1.6 | 22 |
| Comparative Example 13A | 0.7 | 0.8 | 5.1 | 1.2 | 21 |
| Comparative Example 14A | 1.0 | 1.1 | 7.8 | 1.1 | 23 |
| Comparative Example 15A | 3.0 | 3.3 | 8.7 | 0.9 | 22 |
| Comparative Example 16A | 5.0 | 5.6 | 8.2 | 1.3 | 24 |
| Comparative Example 17A | — | — | 8.8 | 8.1 | 20 |

As shown in Table 1A, it is apparent that the battery packaging materials of Examples 1A to 12A in which the adhesive layer disposed between the metal layer and the heat-sealable resin layer includes a resin composition containing an acid-modified polyolefin having a melting point of 50 to 120° C. and an epoxy resin having a weight average molecular weight of 50 to 2000 have excellent durability and insulation quality. On the other hand, many of the battery packaging materials of Comparative Examples 1A to 4A in which the melting point of the acid-modified polyolefin was outside the range of 50° C. to 120° C., Comparative Examples 5A to 8A in which the weight average molecular weight of the epoxy resin was outside the range of 50 to 2000, Comparative Examples 9A to 12A in which an epoxy resin was not used as a curing agent, Comparative Examples 13A to 16A in which an acid-modified polyolefin was not used, and Comparative Example 17 in which an adhesive layer was not provided had lower insulation quality and lower durability as compared to the battery packaging materials of Examples 1A to 12A.

<Measurement of Displacement Amount of Probe Using Thermomechanical Analyzer>

A probe was installed on a surface of the adhesive layer at an end part of the battery packaging material obtained in each of Example 10A and Comparative Example 11A, the probe was heated from 40° C. to 250° C. (temperature elevation rate: 5° C./minute, radius of tip of probe: 30 nm or less, load on probe: deflection—4 V), and the displacement amount of the probe was measured. A graph showing a relationship between a heating temperature and a positional displacement of the probe is shown in each of FIG. 7 (Example 10A) and FIG. 8 (Comparative Example 11A). Details of measurement conditions are as follows. afm plus System manufactured by ANALYSIS INSTRUMENTS Corporation was used as the thermomechanical analyzer, and Cantilever ThermaLever was used as the probe. For calibration, three attached samples (polycaprolactam (melting point: 55° C.), polyethylene (melting point: 116° C.) and polyethylene terephthalate (melting point: 235° C.)) were used, and the applied voltage, the temperature elevation rate and the load on the probe were set to 0.1-10 V, 0.2 V/second and deflection—4 V.

Figure 7:
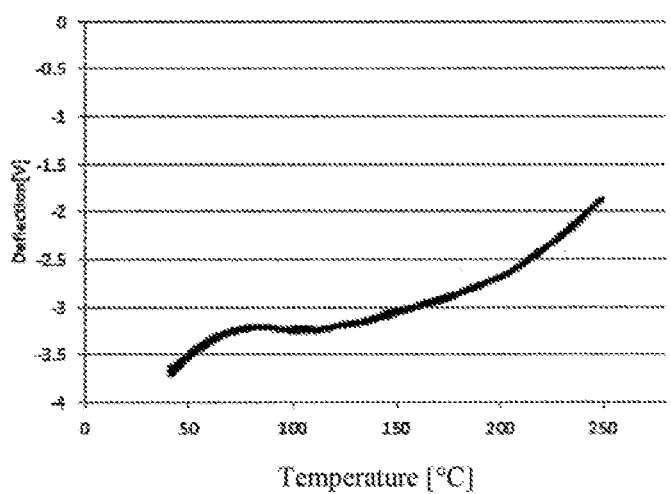
FIG. 7 is a graph showing a relationship between a heating temperature and a positional displacement of a probe of a thermomechanical analyzer in heating of the probe from 40° C. to 250° C. with the probe installed on a surface of an adhesive layer at an end part of the battery packaging material obtained in Example 10A.
Figure 8:
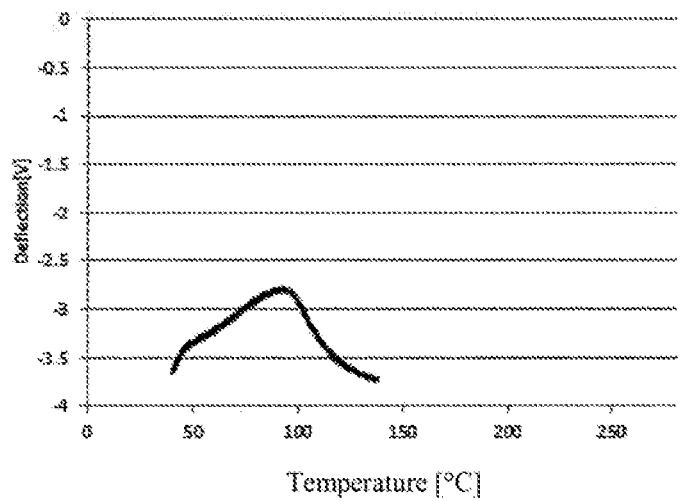
FIG. 8 is a graph showing a relationship between a heating temperature and a positional displacement of a probe of a thermomechanical analyzer in heating of the probe from 40° C. to 250° C. with the probe installed on a surface of an adhesive layer at an end part of the battery packaging material obtained in Comparative Example 11A.

As shown in FIG. 7, it is apparent that in the battery packaging material obtained in Example 10A, in heating of the probe from 40° C. to 220° C. in measurement of the displacement amount of the probe using the thermomechanical analyzer, the position of the probe does not become lower than an initial valued. Further, it is apparent that in Example 10A, the elevation amount of the position of the probe in heating of the probe from 140° C. to 220° C. is larger than the elevation amount of the position of the probe in heating of the probe from 80° C. to 120° C. On the other hand, as shown in FIG. 8, it is apparent that in the battery packaging material obtained in Comparative Example 11A, in heating of the probe from 40° C. to 220° C. in measurement of the displacement amount of the probe using the thermomechanical analyzer, the position of the probe does not become lower than an initial valued.

Examples 1B to 4B and Comparative Examples 1B to 4B

A metal layer formed of an aluminum foil (thickness: 35 µm) subjected to a chemical conversion treatment at both surfaces was laminated on a nylon film (thickness: 25 µm) as a base material layer was laminated using a dry lamination method. Specifically, a two-liquid urethane adhesive (polyol compound and aromatic isocyanate-based compound) was applied to one surface of the aluminum foil, so that an adhesive layer (thickness: 3 µm) was formed on the metal layer. The adhesive layer on the metal layer and the base material layer were then laminated, and an aging treatment was performed at 40° C. for 24 hours to prepare a laminate of base material layer/adhesive agent layer/metal layer. The chemical conversion treatment of the aluminum foil used as the metal layer was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry mass), and performing baking for 20 seconds under such conditions that the film temperature was 180° C. or higher.

Next, 2 g/m$^2$ of a resin as described in Table 1B was applied to the other surface of the metal layer of the obtained laminate, and dried at 80° C. to form a first insulating layer. Next, a laminated film of a second insulating layer and a heat-sealable resin layer each formed of a resin as described in Table 1B was laminated onto the first insulating layer by a dry lamination method. Here, the laminated film was laminated in such a manner that the first insulating layer and the second insulating layer were adjacent to each other. In Comparative Example 1B, a second insulating layer was not provided. In Comparative Example 2, a first insulating layer was not provided. In Example 4B, an adhesive layer, and a laminated film of a second insulating layer and a heat-sealable resin layer were laminated onto a first insulating layer by a dry lamination method. The constituent resin, thickness and melting temperature of each layer are as shown in Table 1B. In Examples 1B to 3B and Comparative Examples 3B and 4B, a laminate including a base material layer, an adhesive layer, a metal layer, a first insulating layer, a second insulating layer and a heat-sealable resin layer in this order was obtained in the above steps. In Example 4B, a laminate including a base material layer, an adhesive layer, a metal layer, a first insulating layer, an adhesive layer, a second insulating layer and a heat-sealable resin layer in this order was obtained. In Comparative Example 1, a laminate including a base material layer, an adhesive layer, a metal layer, a first insulating layer and a heat-sealable resin layer in this order was obtained. In Comparative Example 2, a laminate including a base material layer, an adhesive layer, a metal layer, a second insulating layer and a heat-sealable resin layer in this order was obtained. The obtained laminates were aged at 70° C. for 24 hours to obtain battery packaging materials of Examples 1B to 4B and Comparative Examples 1B to 4B.

<Evaluation of Durability>

The durability of the battery packaging material obtained in each of Examples 1B to 4B and Comparative Examples 1B to 4B was evaluated in the same manner as described above. The results are shown in Table 1B.

<Evaluation of Insulation Quality to Caught Contaminants>

The insulation quality against caught contaminants for the battery packaging material obtained in each of Examples 1B to 4B and Comparative Examples 1B to 4B was evaluated in the same manner as described above. The results are shown in Table 1B.

TABLE 1B

| | First insulating layer | | | Adhesive layer | | | Second insulating layer | | |
|---|---|---|---|---|---|---|---|---|---|
| | Resin | Melting temperature (° C.) | Thickness (μm) | Resin | Melting point (° C.) | Thickness (μm) | Resin | Melting point (° C.) | Thickness (μm) |
| Example 1B | Acid-modified PP + epoxy resin | 230 | 2 | — | — | — | Block PP | 160 | 25 |
| Example 2B | Acid-modified PP + epoxy resin | 230 | 2 | — | — | — | Block PP | 160 | 25 |
| Example 3B | Acid-modified PP + epoxy resin | 230 | 2 | — | — | — | Block PP | 160 | 25 |
| Example 4B | Acid-modified PP + epoxy resin | 230 | 2 | Random PP | 140 | 2 | Block PP | 160 | 25 |
| Comparative Example 1B | Acid-modified PP + epoxy resin | 230 | 2 | — | — | — | — | — | — |
| Comparative Example 2B | — | — | — | — | — | — | Block PP | 160 | 25 |
| Comparative Example 3B | Acid-modified PP + epoxy resin | 70 | 2 | — | — | — | Block PP | 160 | 25 |
| Comparative Example 4B | Acid-modified PP + epoxy resin | 70 | 10 | — | — | — | Block PP | 160 | 25 |

| | Heat-sealable resin layer | | | Evaluation of durability Peeling strength (N/15 mm) | | Evaluation of insulation quality Time until short-circuit occurred (seconds) |
|---|---|---|---|---|---|---|
| | Resin | Melting point (° C.) | Thickness (μm) | Before test | After test | |
| Example 1B | Random PP | 140 | 10 | 9.8 | 8.8 | 48 |
| Example 2B | Random PP | 140 | 5 | 9.2 | 8.7 | 44 |
| Example 3B | Random PP | 140 | 2 | 9.7 | 8.9 | 45 |
| Example 4B | Random PP | 140 | 2 | 10.1 | 9.1 | 43 |
| Comparative Example 1B | Random PP | 140 | 35 | 9.8 | 8.9 | 27 |
| Comparative Example 2B | Random PP | 140 | 10 | 8.8 | 1.9 | 18 |
| Comparative Example 3B | Random PP | 140 | 10 | 10.3 | 2.1 | 19 |
| Comparative Example 4B | Random PP | 140 | 10 | 12.1 | 3.4 | 22 |

In Table 1B, the acid-modified PP means maleic anhydride-modified polypropylene, the random PP means a random propylene copolymer, and the block PP means a block propylene copolymer.

As shown in Table 1B, it is apparent that in the battery packaging materials of Examples 1B to 4B where the battery packaging material includes a laminate including at least a base material layer, a metal layer, a first insulating layer, a second insulating layer and a heat-sealable resin layer in this order, the melting temperature of the first insulating layer is 200° C. or higher, and the melting temperature of the second insulating layer is set lower than the melting temperature of the first insulating layer, the battery packaging material has excellent durability and insulation quality. The battery packaging material of Comparative Example 1 which was not provided with a second insulating layer had poor insulation quality. The battery packaging material of Comparative Example 2B which was not provided with a first insulating layer had poor durability and insulation quality. The battery packaging materials of Comparative Examples 3B and 4B in which a first insulating layer and a second insulating layer were provided, and the melting temperature of the first insulating layer was lower than 200° C. had poor durability and insulation quality.

DESCRIPTION OF REFERENCE SIGNS

1: Base material layer
2: Adhesive agent layer
3: Metal layer
4: Adhesive layer
5: Heat-sealable resin layer
6: Adhesive layer
7: Adhesive layer
10: Probe
41: Heat-sealable resin layer
51: First insulating layer
52: Second insulating layer

The invention claimed is:

1. A battery packaging material including a laminate including at least a base material layer, a metal layer, an adhesive layer and a heat-sealable resin layer in this order, wherein
the adhesive layer is a cured product of a resin composition containing an acid-modified polyolefin and an epoxy resin,
in heating of a probe from 40° C. to 220° C. with the probe installed on a surface of the adhesive layer at an end part of the battery packaging material in measurement of the amount of displacement of the probe using a thermomechanical analyzer, the position of the probe does not become lower than an initial value,
the acid-modified polyolefin comprises at least one of a polyethylene or polypropylene modified with an unsaturated carboxylic acid or acid anhydride thereof,
the acid-modified polyolefin has a melting point of 50° C. or higher and 120° C. or lower and the epoxy resin has a weight average molecular weight of 50 or more and 2000 or less, and
the battery packaging material has a peeling strength after durability test that is at least 5.1 N/15 mm.

2. The battery packaging material according to claim 1, wherein in heating of a probe from 40° C. to 220° C. with the probe installed on a surface of the adhesive layer at an end part of the battery packaging material in measurement of the amount of displacement of the probe using a thermo-mechanical analyzer, the position elevation amount of the probe in heating of the probe from 140° C. to 220° C. is larger than the position elevation amount of the probe in heating of the probe from 80° C. to 120° C.

3. The battery packaging material according to claim 1, wherein the battery packaging material has a time until short circuit occurred that is at least 38 seconds.

4. A battery packaging material including a laminate including at least a base material layer, a metal layer, an adhesive layer and a heat-sealable resin layer in this order, wherein
the adhesive layer is a cured product of a resin composition containing an acid-modified polyolefin having a melting point of 50° C. or higher and 120° C. or lower and an epoxy resin having a weight average molecular weight of 50 or more and 2000 or less, the acid-modified polyolefin comprises at least one of a polyethylene or polypropylene modified with an unsaturated carboxylic acid or acid anhydride thereof, and
the battery packaging material has a peeling strength after durability test that is at least 5.1N/15 mm.

5. The battery packaging material according to claim 1, wherein a solid content of the adhesive layer is 0.5 g/m² or more and 10 g/m² or less.

6. The battery packaging material according to claim 1, wherein a thickness of the adhesive layer is 0.6 μm or more and 11 μm or less.

7. The battery packaging material according to claim 1, wherein the resin composition contains 0.5 parts by mass or more and 20 parts by mass or less of the epoxy resin based on 100 parts by mass of the acid-modified polyolefin.

8. The battery packaging material according to claim 1, wherein a melting temperature of the adhesive layer is 180° C. or higher and 260° C. or lower.

9. The battery packaging material according to claim 1, wherein a thickness of the heat-sealable resin layer is 10 μm or more and 40 μm or less.

10. The battery packaging material according to claim 1, wherein the heat-sealable resin layer has fine irregularities on a surface thereof.

11. A method for producing a battery packaging material, the method including a lamination step of preparing a laminate including at least a base material layer, a metal layer, an adhesive layer and a heat-sealable resin layer in this order, wherein
a resin composition containing an acid-modified polyolefin and an epoxy resin is used in formation of the adhesive layer,
the adhesive layer is an adhesive layer in which in heating of a probe from 40° C. to 220° C. with the probe installed on a surface of the adhesive layer at an end part of the battery packaging material in measurement of the displacement amount of the probe using a thermomechanical analyzer, the position of the probe does not become lower than an initial value,
the acid-modified polyolefin comprises at least one of a polyethylene or polypropylene modified with an unsaturated carboxylic acid or acid anhydride thereof,
the acid-modified polyolefin has a melting point of 50° C. or higher and 120° C. or lower and the epoxy resin has a weight average molecular weight of 50 or more and 2000 or less, and
the battery packaging material has a peeling strength after durability test that is at least 5.1 N/15 mm.

12. The battery packaging material according to claim 1, wherein the heat-sealable resin layer is formed of a polyolefin.

13. A battery, wherein a battery element including a positive electrode, a negative electrode and an electrolyte is encapsulated in a package formed of the battery packaging material according to claim 1.

14. The battery packaging material according to claim 4, wherein the battery packaging material has a time until short circuit occurred that is at least 38 seconds.

15. The battery packaging material according to claim 4, wherein a solid content of the adhesive layer is 0.5 g/m² or more and 10 g/m² or less.

16. The battery packaging material according to claim 4, wherein a thickness of the adhesive layer is 0.6 μm or more and 11 μm or less.

17. The battery packaging material according to claim 4, wherein the resin composition contains 0.5 parts by mass or more and 20 parts by mass or less of the epoxy resin based on 100 parts by mass of the acid-modified polyolefin.

18. The battery packaging material according to claim 4, wherein a melting temperature of the adhesive layer is 180° C. or higher and 260° C. or lower.

19. The battery packaging material according to claim 4, wherein a thickness of the heat-sealable resin layer is 10 μm or more and 40 μm or less.

20. The battery packaging material according to claim 4, wherein the heat-sealable resin layer has fine irregularities on a surface thereof.

21. A method for producing a battery packaging material, the method including a lamination step of preparing a laminate including at least a base material layer, a metal layer, an adhesive layer and a heat-sealable resin layer in this order, wherein
- a resin composition containing an acid-modified polyolefin and an epoxy resin is used in formation of the the acid-modified polyolefin comprises at least one of a polyethylene or polypropylene modified with an unsaturated carboxylic acid or acid anhydride thereof,
- the acid-modified polyolefin has a melting point of 50° C. or higher and 120° C. or lower and the epoxy resin has a weight average molecular weight of 50 or more and 2000 or less, and
- the battery packaging material has a peeling strength after durability test that is at least 5.1 N/15 mm.

22. The battery packaging material according to claim 4, wherein the heat-sealable resin layer is formed of a polyolefin.

23. A battery, wherein a battery element including a positive electrode, a negative electrode and an electrolyte is encapsulated in a package formed of the battery packaging material according to claim 4.

\* \* \* \* \*